(12) United States Patent
Cracauer et al.

(10) Patent No.: US 6,932,943 B1
(45) Date of Patent: Aug. 23, 2005

(54) NUCLEIC ACID SYNTHESIZERS

(75) Inventors: Raymond F. Cracauer, Middleton, WI (US); Zbigniev Skrzypczynski, Verona, WI (US); Ned D. Reimer, Madison, WI (US); Rocky Ganske, Madison, WI (US)

(73) Assignee: Third Wave Technologies, Madison, WI (US)

( * ) Notice: Subject to any disclaimer, the term of this patent is extended or adjusted under 35 U.S.C. 154(b) by 450 days.

(21) Appl. No.: 09/771,332

(22) Filed: Jan. 26, 2001

(51) Int. Cl.⁷ .................................................. B01J 19/00
(52) U.S. Cl. ........................ 422/130; 422/99; 422/102; 422/129; 422/131
(58) Field of Search ........................ 422/99, 100, 101, 422/102, 103, 104, 129, 130, 131

(56) References Cited

U.S. PATENT DOCUMENTS

| | | | |
|---|---|---|---|
| 3,917,455 A | 11/1975 | Bak et al. ...................... 23/253 |
| 4,353,989 A | 10/1982 | Bender et al. ............... 435/287 |
| 4,401,796 A | 8/1983 | Itakura ....................... 535/340 |
| 4,458,066 A | 7/1984 | Caruthers et al. ............. 536/27 |
| 4,483,964 A | 11/1984 | Urdea et al. ............. 525/54.11 |
| 4,517,338 A | 5/1985 | Urdea et al. ............. 525/54.11 |
| 4,598,045 A | 7/1986 | Masover et al. ............... 435/34 |
| 4,598,049 A | 7/1986 | Zelinka et al. .............. 435/287 |
| 4,689,405 A | 8/1987 | Frank et al. ................... 536/27 |
| 4,734,363 A | 3/1988 | Dattagupta et al. ........... 435/91 |
| 4,744,037 A | 5/1988 | Niina et al. .................. 364/497 |
| 4,837,159 A | 6/1989 | Yamada ........................ 436/45 |
| 4,950,745 A | 8/1990 | Ishido et al. .................. 536/58 |
| 5,047,524 A | 9/1991 | Andrus et al. ................. 536/27 |
| 5,053,454 A | 10/1991 | Judd ....................... 525/54.11 |
| 5,112,575 A | 5/1992 | Whitehouse et al. ....... 422/116 |
| 5,112,962 A | 5/1992 | Letsinger et al. ............. 536/27 |
| 5,143,418 A | 9/1992 | Fouquet ....................... 536/27 |
| 5,149,798 A | 9/1992 | Agrawal et al. ............... 536/27 |
| 5,153,319 A | 10/1992 | Caruthers et al. ............. 536/27 |
| 5,262,530 A | 11/1993 | Andrus et al. ........... 536/25.31 |
| 5,264,562 A | 11/1993 | Matteucci .................. 536/23.1 |
| 5,264,566 A | 11/1993 | Froehler et al. ......... 536/25.34 |
| 5,298,259 A | 3/1994 | Lloyd et al. ................. 424/486 |
| 5,324,831 A | 6/1994 | Marquez et al. ........... 536/25.3 |
| 5,368,823 A | 11/1994 | McGraw et al. ............. 422/134 |
| 5,437,979 A | 8/1995 | Rampal et al. ................. 435/6 |
| 5,443,791 A | 8/1995 | Cathcart et al. .............. 422/65 |
| 5,462,748 A | 10/1995 | Lloyd et al. ................. 424/484 |
| 5,466,608 A | 11/1995 | Lapluye et al. ................ 436/86 |
| 5,472,672 A | 12/1995 | Bennan ....................... 422/131 |
| 5,503,805 A | 4/1996 | Sugarman et al. .......... 422/131 |
| 5,514,789 A | 5/1996 | Kempe ....................... 536/25.4 |
| 5,518,651 A | 5/1996 | Reddy et al. ................ 252/193 |
| 5,541,314 A | 7/1996 | McGraw et al. ......... 536/25.31 |
| 5,548,076 A | 8/1996 | Froehler et al. ......... 536/25.34 |

(Continued)

FOREIGN PATENT DOCUMENTS

| | | |
|---|---|---|
| WO | WO 91/13084 | 9/1991 |
| WO | WO 98/10857 | 3/1998 |
| WO | WO 98/36829 | 8/1998 |
| WO | WO 98/39099 | 9/1998 |
| WO | WO 98/57181 | 12/1998 |
| WO | WO99/65602 | 12/1999 |
| WO | WO 00/56445 | 9/2000 |

*Primary Examiner*—Jill Warden
*Assistant Examiner*—Dwayne K Handy
(74) *Attorney, Agent, or Firm*—Medlen & Carroll, LLP

(57) ABSTRACT

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety.

7 Claims, 11 Drawing Sheets

U.S. PATENT DOCUMENTS

| | | | |
|---|---|---|---|
| 5,580,523 A | 12/1996 | Bard | 422/50 |
| 5,609,826 A * | 3/1997 | Cargill et al. | 422/99 |
| 5,616,700 A | 4/1997 | Reddy et al. | 536/25.3 |
| 5,620,852 A | 4/1997 | Lin et al. | 435/6 |
| 5,639,873 A | 6/1997 | Barascut et al. | 536/25.3 |
| 5,646,267 A | 7/1997 | Stec et al. | 536/25.33 |
| 5,652,358 A | 7/1997 | Pfleiderer et al. | 536/25.3 |
| 5,668,266 A | 9/1997 | Ruth | 536/25.3 |
| 5,668,268 A | 9/1997 | Tang et al. | 536/25.3 |
| 5,700,919 A | 12/1997 | Seliger et al. | 536/22.1 |
| 5,703,218 A | 12/1997 | Urdea et al. | 536/23.1 |
| 5,703,223 A | 12/1997 | Wickstrom et al. | 536/25.33 |
| 5,723,599 A | 3/1998 | Klem et al. | 536/25.3 |
| 5,726,300 A | 3/1998 | Klem et al. | 536/25.34 |
| 5,736,626 A | 4/1998 | Mullah et al. | 536/25.3 |
| 5,762,881 A | 6/1998 | Harness et al. | 422/132 |
| 5,770,157 A | 6/1998 | Cargill et al. | 422/99 |
| 5,789,162 A | 8/1998 | Dower et al. | 435/6 |
| 5,792,430 A | 8/1998 | Hamper | 422/131 |
| 5,840,841 A | 11/1998 | Zuckermann et al. | 530/338 |
| 5,865,224 A | 2/1999 | Ally et al. | 141/130 |
| 5,874,554 A | 2/1999 | Gamble et al. | 536/22.1 |
| 5,885,837 A | 3/1999 | Winkler et al. | 435/91.1 |
| 5,935,527 A | 8/1999 | Andrus et al. | 422/131 |
| 5,961,925 A * | 10/1999 | Ruediger et al. | 422/99 |
| 5,981,733 A | 11/1999 | Gamble et al. | 536/25.3 |
| 6,045,755 A | 4/2000 | Lebl et al. | 422/65 |
| 6,057,424 A | 5/2000 | Vail, III | 530/333 |
| 6,096,276 A | 8/2000 | Laursen | 422/103 |
| 6,126,904 A | 10/2000 | Zuellig et al. | 422/130 |
| 6,150,102 A | 11/2000 | Mills, Jr. et al. | 435/6 |
| 6,165,717 A | 12/2000 | Dower et al. | 435/6 |
| 6,171,555 B1 | 1/2001 | Cargill et al. | 422/104 |
| 6,175,006 B1 | 1/2001 | Andrus et al. | 536/25.4 |
| 6,177,554 B1 | 1/2001 | Woo et al. | 536/23.1 |
| 6,225,061 B1 | 5/2001 | Becker et al. | 435/6 |
| 6,264,891 B1 | 7/2001 | Heyneker et al. | 422/64 |
| 6,270,730 B1 | 8/2001 | McLuen et al. | 422/131 |
| 6,280,950 B1 | 8/2001 | Lipshutz et al. | 435/6 |
| 6,309,608 B1 * | 10/2001 | Zhou et al. | 422/131 |
| 6,309,828 B1 * | 10/2001 | Schleifer et al. | 435/6 |
| 6,313,284 B1 | 11/2001 | Kwiatkowski et al. | 536/25.3 |
| 6,320,025 B1 * | 11/2001 | Slavazza et al. | 530/334 |
| 6,329,210 B1 | 12/2001 | Schleifer | 436/518 |
| 6,455,007 B1 * | 9/2002 | Mansky et al. | 422/101 |
| 6,479,020 B1 * | 11/2002 | Stanchfield et al. | 422/102 |
| 2001/0000723 A1 | 5/2001 | McLuene t al. | 422/100 |
| 2001/0001035 A1 | 5/2001 | McLuen et al. | 422/100 |
| 2001/0007644 A1 | 7/2001 | McLuen et al. | 422/131 |
| 2001/0022950 A1 | 9/2001 | Hall et al. | 422/131 |

* cited by examiner

NUCLEIC ACID SYNTHESIZERS

FIELD OF THE INVENTION

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety. The present invention also relates to synthesizer arrays for efficient, safe, and automated processes for the production of large quantities of oligonucleotides.

BACKGROUND

With the completion of the Human Genome Project and the increasing volume of genetic sequence information available, genomics research and subsequent drug design efforts have been increasing as well. Many diagnostic assays and therapeutic methods utilize oligonucleotides. The information obtained from genomic analysis provides valuable insight into the causes and mechanisms of a large variety of diseases and conditions, while oligonucleotides can be used to alter gene expression in cells and tissues to prevent or attenuate diseases or alter physiology. As more nucleic acid sequences continue to be identified, the need for larger quantities of oligonucleotides used in assays and therapeutic methods increases.

To meet the increasing demand for nucleic acid synthesis, there has been an increase in the variety of designs, and the volume of production of nucleic acid synthesizers. Unfortunately, the currently available synthesizers are not designed to adequately meet the needs of the industry. In particular, available synthesizers are limited in their ability to efficiently synthesize large numbers of oligonucleotides. While synthesizers have been developed to simultaneously synthesize more than one oligonucleotide at a time, such machines are not efficient at the production of different types of nucleic acids simultaneously (e.g., different lengths of nucleic acids) and are unacceptably prone to performance failures and environmental contamination. Furthermore, available synthesizes are not suitably configured for use in large-scale nucleic acid production facilities or for automated nucleic acid synthesis. Thus, the art is in need of nucleic acid synthesizers that are safe, efficient, flexible, and are amenable to large-scale production and automation.

SUMMARY OF THE INVENTION

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety. The present invention also relates to synthesizer arrays for efficient, safe, and automated processes for the production of large quantities of oligonucleotides.

In some embodiments, the present invention provides systems comprising a synthesis and purge component, the synthesis and purge component comprising a cartridge and a drain plate, wherein the cartridge is configured to hold one or more nucleic acid synthesis columns and wherein the cartridge is separated from the drain plate by a drain plate gasket. In certain embodiments, the cartridge is configured to hold a plurality of nucleic acid synthesis columns. In particular embodiments, the cartridge is configured to hold 12 or more nucleic acid synthesis columns. In other embodiments, the cartridge is configured to hold 48 or more nucleic acid synthesis columns. In additional embodiments, the cartridge is configured to hold exactly 48 nucleic acid synthesis columns.

In certain embodiments, the drain plate gasket provides a substantially air-tight seal between the cartridge and the drain plate. In other embodiments, the drain plate gasket provides an air-tight seal between the cartridge and the drain plate. In some embodiments, the drain plate gasket comprises one or more alignment markers configured to allow aligned attachment of said cartridge to said drain plate. In additional embodiments, the drain plate gasket comprises one or more alignment markers configured to allow aligned attachment of the drain plate gasket to the cartridge. In other embodiments, the drain plate gasket comprises one or more alignment markers configured to allow aligned attachment of the gasket to the drain plate. In certain embodiments, the drain plate gasket comprises at least one drain cut-out. In other embodiments, the drain plate gasket comprises at least four drain cut-outs. In still other embodiments, the drain plate gasket comprises one drain cut out for every synthesis column in the cartridge.

In some embodiments, the present invention provides systems comprising a synthesis and purge component, the synthesis and purge component comprising a cartridge and a drain plate, wherein the cartridge is configured to hold one or more nucleic acid synthesis columns and wherein the cartridge is separated from the drain plate by a drain plate gasket. In some embodiments, the drain plate comprises at least one drain (e.g. 1, 2, 3, 4, 5, 10, . . . 20, . . . ). In other embodiments, the system further comprises a waste tube, the waste tube comprising input and output ends, wherein the input end is configured to receive waste materials from the drain. In particular embodiments, the waste tube comprises an inner diameter of at least 0.187 inches (preferably at least 0.25 inches). In some embodiments, the waste tube and the drain are configured such that, when the drain is contacted with the waste tube for waste removal, the waste tube encloses at least a portion of the drain (See, e.g., FIG. 8). In particular embodiments, the drain forms a sealed contact point with an interior portion of the waste tube when the drain is enclosed in the waste tube. In still other embodiments, the drain further comprises a drain sealing ring. In certain embodiments, the system further comprises a waste valve wherein the waste valve is configured to receive waste from the output end of the waste tube. In particular embodiments, the waste valve comprises an interior diameter of at least 0.187 inches (preferably at least 0.25 inches). In some embodiments, the waste valve provides a straight-through path for the waste (e.g. as opposed to an angled path). Straight-through paths can be accomplished, for example, by the use of a gate or ball valve.

In some embodiments, the system further comprises a plurality of dispense lines, the dispense line configured for delivering at least one reagent to a synthesis column in the cartridge. In certain embodiments, the dispense lines comprise an interior diameter of at least 0.25 mm. In particular embodiments, the system further comprises an alignment detector. In particular embodiments, the alignment detector is configured to detect the alignment of a waste tube and a drain. In other embodiments, the alignment detector is configured to detect the alignment of a dispense line and a receiving hole of the cartridge. In some embodiments, the alignment detector is configured to detect a tilt alignment of the synthesis and purge component.

In some embodiments, the system of the present invention further comprises a motor attached to the synthesis and purge component and configured to rotate the synthesis and purge component. In particular embodiments, the motor is attached to the synthesis and purge component by a motor connector. In further embodiments, the system further comprises a bottom chamber seal positioned between the motor connector and the synthesis and purge component. In certain embodiments, the system of the present invention comprises two drain. In preferred embodiments, the two drain are located on opposite sides of the drain plate.

In some embodiments of the systems of the present invention, the synthesis and purge component is contained in a chamber. In certain embodiments, a chamber bowl and a top cover (when in place) combine to form a chamber (e.g. which may be pressurized with inert gas). One example is depicted in FIG. 2 where chamber bowl 18 and top cover 30 combine to form an examplary chamber. In some embodiments, the chamber comprises a bottom surface (e.g. bottom of a chamber bowl, see, e.g. FIG. 9) comprising the top portion of two waste tubes (which may, for example, extend downward from bottom of the chamber). In preferred embodiments, the waste tubes are positioned symmetrically on the bottom surface of the chamber (see, e.g., FIG. 9).

In particular embodiments, the systems of the present invention further comprise a chamber drain having open and closed positions, the chamber drain configured to allow gas emissions (or liquid waste) to pass out of the chamber when in the open position.

In some embodiments, the systems of the present invention further comprise a reagent dispensing station, wherein the reagent dispensing station is configured to house one or more reagent reservoirs, such that reagents in reagent reservoirs can be delivered to the cartridge. In certain embodiments, the reagent dispensing station comprises a ventilation tube configured to remove gaseous emissions from the reagent dispensing station.

In particular embodiments, the systems of the present invention are capable of maintaining a gas pressure in the chamber sufficient to purge synthesis columns prior to addition of reagents to the synthesis columns.

In some embodiments, the nucleic acid synthesis systems of the present invention comprise a cartridge in a chamber, the cartridge comprising a plurality of synthesis columns, wherein the synthesis columns contain packing material that provides a resistance against pressurized gas contained in the chamber, the resistance being sufficient to maintain a pressure in the chamber that is capable of purging synthesis columns prior to addition of reagents to the synthesis columns. In certain embodiments, one or more of the plurality of synthesis columns does not undergo a synthesis reaction. In particular embodiments, two or more different lengths of oligonucleotides are synthesized in the plurality of synthesis columns. In other embodiments, the packing material comprises a frit. In some embodiments, the frit is a bottom frit. In other embodiments, the frit is a top frit. In preferred embodiments, the packing material comprises a top frit, solid support, and a bottom frit. In particularly preferred embodiments, the solid support is polystyrene. In some embodiments, the packing material comprises a synthesis matrix.

In some embodiments, the present invention provides nucleic acid synthesis systems comprising a synthesis and purge component in a pressurized chamber, the synthesis and purge component comprising a plurality of synthesis columns, wherein the synthesis columns contain packing material sufficient to maintain pressure in the chamber during a purging operation to purge liquid reagent from the plurality of synthesis columns when at least one of the plurality of synthesis columns does not contain liquid reagent. In certain embodiments, more than one of the plurality of synthesis columns (e.g. 2, 3, 5, 10) do not contain liquid reagent (and the remaining synthesis columns do contain liquid reagent).

In certain embodiments, the present invention provides nucleic acid synthesis systems comprising: a) a synthesis and purge component, the synthesis and purge component comprising a cartridge and a drain plate separated by a drain plate gasket, wherein the cartridge is configured to hold twelve or more nucleic acid synthesis columns; b) a drain positioned in the drain plate; c) a chamber comprising an inner surface, the chamber housing the synthesis and purge component and the drain; d) a waste tube, the waste tube comprising input and output ends, wherein the input end is configured to receive waste materials from the drain, wherein the waste tube comprises an inner diameter of at least 0.187 inches; e) a waste valve configured to receive waste from the output end of the waste tube, wherein the waste valve comprises in interior diameter of at least 0.187 inches; f) a reagent dispensing station, wherein the reagent dispensing station is configured to house one or more reagent reservoirs; g) a plurality of dispense lines, the dispense lines configured for delivering reagents from the reagent reservoirs to a synthesis column in the cartridge, wherein the dispense lines comprise an interior diameter of at least 0.25 mm) a rotating motor attached to the synthesis and purge component by a motor connector and configured to rotate the synthesis and purge component; and i) a gas line configured to release gas into the chamber to create a gas pressure in the chamber greater than a gas pressure in the waste tube. In certain embodiments, the system is capable of maintaining gas pressure in the chamber at a sufficient level to purge the synthesis columns prior to addition of reagents to the synthesis columns.

In some embodiments, the present invention provides methods for synthesizing nucleic acids comprising: a) providing: i) a nucleic acid synthesizer comprising a synthesis and purge component, the synthesis and purge component comprising a cartridge and a drain plate, wherein the cartridge holds a plurality of nucleic acid synthesis columns and wherein the cartridge is separated by a drain plate gasket from the drain plate, and ii) nucleic acid synthesis reagents; and b) introducing a portion of the nucleic acid synthesis reagents into at least one of the nucleic acid synthesis columns to provide a first synthesis reaction; c) purging the nucleic acid synthesis columns by creating a pressure differential across the nucleic acid synthesis columns; and d) introducing a second portion of the nucleic acid synthesis reagents into at least one of the nucleic acid synthesis columns to provide a second synthesis reaction. In particular embodiments, the drain plate gasket provides a substantially air-tight seal between the cartridge and the drain plate. In other embodiments, the drain plate gasket provides an air-tight seal between the cartridge and the drain plate.

In some embodiments, the present invention provides high-throughput oligonucleotide production systems comprising: an oligonucleotide synthesizer array, wherein the oligonucleotide synthesizer array comprises at least 5 oligonucleotide synthesizers. In preferred embodiments, the oligonucleotide synthesizer array comprises at least 10 or at least 100 oligonucleotide synthesizers. In certain embodiments, the system further comprises a centralized control network operably linked to the oligonucleotide synthesizer component.

In particular embodiments, the present invention provides methods for the high through-put production of oligonucleotides comprising; a) providing an oligonucleotide synthesizer array; and b) generating a high through-put quantity of oligonucleotides with the oligonucleotide synthesizer array, wherein the high through-put quantity comprises at least 1 per hour (e.g. at least 1, 10, 100, 1000, etc, per hour).

GENERAL DESCRIPTION OF THE INVENTION

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis (e.g. arrays of synthesizers), as well as methods of modifying pre-existing synthesizers to improve efficiency, reliability, and safety.

A problem with currently available synthesizers is the emission of undesirable gaseous or liquid materials that pose health, environmental, and explosive hazards. Such emissions result from both the normal operation of the instrument and from instrument failures. Emissions that result from instrument failures cause a reduction or loss of synthesis efficiency and can provoke further failures and/or complete synthesizer failure. Correction of failures may require taking the synthesizer off-line for cleaning and repair. The present invention provides nucleic acid synthesizers with components that reduce or eliminate unwanted emissions and that compensate for and facilitate the removal of unwanted emissions, to the extent that they occur at all. The present invention also provides waste handling systems to eliminate or reduce exposure of emissions to the users or the environment. Such systems find use with individual synthesizers, as well as in large-scale synthesis facilities comprising many synthesizers (e.g. arrays of synthesizers).

In some particularly preferred embodiments, the present invention provides efficient and safe "open synthesizers." Open system synthesizers are contrasted to "closed system synthesizers" in that the reagent delivery, synthesis compartments, and waste extraction for each synthesis column are not contained in a system that remains physically closed (i.e., closed from both the ambient environment and from the other synthesis columns in the same instrument) for the duration of the synthesis run. For example, in a closed system, tubing (or other means) provided for the addition and removal of reagent to each reaction compartment or synthesis column is generally fixed to the column with a coupling that is sealed to isolate the contents of that system from its surroundings. In contrast, in an open system, the dispensing and/or removal of reagent may be through means that are not physically coupled to the reaction compartment. Further, a common dispensing or waste removal means may be shared by multiple reaction compartments, such that each compartment sharing the means is serviced in turn. An example of an "open system synthesizer" is described in PCT Publication WO 99/65602, herein incorporated by reference in its entirety. This publication describes a rotary synthesizer for parallel synthesis of multiple oligonucleotides. The tubing that supplies the synthesis reagents to the synthesis column does not form a continuous closed seal to the synthesis columns. Instead, the rotor turns, exposing the synthesis columns, in series, to the dispense lines, which inject synthesis reagents into the synthesis column. Open synthesizers offer advantages over closed synthesizers for the simultaneous production of multiple oligonucleotides. For example, a large number of independent synthesis columns, each intended to produce a distinct oligonucleotide, are exposed to a smaller number of dedicated reagent dispensers (e.g., four dedicated dispensers for each of the nucleotides). Open systems also provide easy access to synthesis columns, which can be added or removed without detaching any otherwise fixed connections to reagent dispensing tubing.

While open synthesizers have advantages for the production of oligonucleotides, they suffer from increased problems of emissions and failures. The direct exposure of the columns to their surroundings and the non-continuous path of reagents increases the number of points at which gaseous and liquid emissions occur, thereby increasing the release of unwanted emissions to the atmosphere and leakage within the synthesizer. Many synthesizers carry out reagent delivery, nucleic acid synthesis, and waste disposal under pressurized conditions. Open systems have frequent problems with loss of pressure, resulting in instrument failures and/or loss of synthesis efficiency. The open system synthesizers of the present invention dramatically reduce instrument failures and the corresponding emissions.

Whether a system used is open or closed, oligonucleotide synthesis involves the use of an array of hazardous materials, including but not limited to methylene chloride, pyridine, acetic anhydride, 2,6-lutidine and acetonitrile. These reagents can have a variety of harmful effects on those who may be exposed to them. They can be mildly or extremely irritating or toxic upon short-term exposure; several are more severely toxic and/or carcinogenic with long-term exposure. Many can create a fire or explosion hazard if not properly contained. In addition, many of these chemicals must be assessed for emissions from normal operations, e.g for determining compliance with OSHA or environmental agency standards. Malfunction of a system, e.g., as recited above, increases such emissions, thereby increasing the risk of operator exposure, and increasing the risk that an instrument may need to be shut down until risk to an operator is reduced and until any regulatory requirements for operation are met.

Emission or leakage of reagents during operation can have consequences beyond risks to personnel and to the environment. As noted above, instruments may need to be removed from operation for cleaning, leading to a temporary decrease in production capacity of a synthesis facility. Further, any emission or leakage may cause damage to parts of the instrument or to other instruments or aspects of the facility, necessitating repair or replacement of any such parts or aspects, increasing the time and cost of bringing an instrument back into operation. Failure to address emissions or leakage concerns may lead to additional expenses for operation of a facility, e.g., costs for increased or improved fire or explosion containment measures, and addition of costs associated with the elimination of any instrument systems or wiring that have not been determined to be safe for use in such hazardous locations (e.g., by reference to controlling codes, such as electrical codes, or codes covering operations in the presence of flammable and combustible liquids).

The synthesizers of the present invention provide a number of novel features that dramatically improve synthesizer performance and safety compared to available synthesizers. These novel features work both independently and in conjunction to provide enhanced performance. For example, in some embodiments, the synthesizers of the present invention prevent loss of pressure during synthesis and waste disposal. By preventing loss of pressure, synthesis columns are purged properly and do not overflow during subsequent synthesis steps. Thus, prevention of pressure loss further prevents liquid overflow and instrument contamination. Additionally, in some embodiments, sufficient pressure differentials are maintained across all columns to allow efficient synthesis and purging without instrument failure. For example, regardless of whether synthesis columns are actively involved in a particular round of synthesis (e.g., short oligonucleotides will be completed prior to the completion of longer oligonucleotides and will not be actively synthesized during the later round of synthesis), sufficient pressure differentials are maintained to allow reagent delivery and purging from the active columns. A number of additional features of the synthesizers of the present invention are described in detail below.

In addition to providing efficient synthesizers, the present invention provides methods for modifying existing synthesizer to improve their efficiency. For example, one or more of the novel components of the present invention may be added into or substituted into existing synthesizers to improve efficiency and performance.

The present invention further provides means of reducing exposure of operators and the environment to synthesis reagents and waste. In one embodiment, the present invention reduces exposure by improving collection and disposal of emissions that occur during the normal operation of various synthesis instruments. In another embodiment, the present invention reduces exposure by improving aspects of the instrument to reduce risk of malfunctions leading to reagent escape from the system, e.g., through leakage, overflow or other spillage.

DEFINITIONS

To facilitate an understanding of the present invention, a number of terms and phrases are defined below:

As used herein, the term "coupled," as in "coupled attachment," refers to attachments between objects that do not, by themselves, provide a pressure-tight seal. For example, two metal plates that are attached by screws or pins may comprise a coupled attachment. While the two plates are attached, the seam between them does not form a pressure-tight seal (i.e., gas and/or liquid can escape through the seam).

As used herein, the terms "centralized control system" or "centralized control network" refer to information and equipment management systems (e.g., a computer processor and computer memory) operable linked to a module or modules of equipment (e.g., DNA synthesizer or a computer operably linked to a DNA synthesizer).

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), flash (solid state) recording media and magnetic tape.

As used herein, the term "synthesis and purge component" refers to a component of a synthesizer containing a cartridge for holding one or more synthesis columns attached to or connected to a drain plate for allowing waste or wash material from the synthesis columns to be directed to a waste disposal system.

As used herein, the term "cartridge" refers to a device for holding one or more synthesis columns. For example, cartridges can contain a plurality of openings (e.g., receiving holes) into which synthesis columns may be placed.

As used herein, the term "nucleic acid synthesis column" or "synthesis column" refers to a container in which nucleic acid synthesis reactions are carried out. For example, synthesis columns include plastic cylindrical columns and pipette tip formats, containing openings at the top and bottom ends. The containers may contain or provide one or more matrices, solid supports, and/or synthesis reagents necessary to carry out chemical synthesis of nucleic acids. For example, in some embodiments of the present invention, synthesis columns contain a solid support matrix on which a growing nucleic acid molecule may be synthesized.

As used herein, the term "seal" refers to any means for preventing the flow of gas or liquid through an opening. For example, a seal may be formed between two contacted materials using grease, o-rings, gaskets, and the like. An "air-tight seal" or "pressure tight seal" is a seal that prevents detectable amounts of air from passing through an opening. A "substantially airtight" seal is a seal that prevents all but negligible amounts of air from passing through an opening. Negligible amounts of air are amounts that are tolerated by the particular system, such that desired system function is not compromised. For example, a seal in a nucleic acid synthesizer is considered substantially airtight if it prevents gas leaks in a reaction chamber, such that the gas pressure in the reaction chamber is sufficient to purge liquid in synthesis columns contained in the reaction chamber following a synthesis reaction. If gas pressure is depleted by a leak such that synthesis columns are not purged (e.g., resulting in overflow during subsequent synthesis rounds), then the seal is not a substantially airtight seal. A substantially air-tight seal can be detected empirically by carrying out synthesis and checking for failures (e.g., column overflows) during one or a series of reactions.

As used herein, the term "sealed contact point" refers to sealed seams between two or more objects. Seals on sealed contact points can be of any type that prevent the flow of gas or liquid through an opening. For example, seals can sit on the surface of a seam (e.g., a face seal) or can be placed within a seam, such that a circumferential contact is created within the seam.

As used herein, the term "alignment detector" refers to any means for detecting the position of an object with respect to another object or with respect to the detector. For example, alignment detectors may detect the alignment of a dispensing end of a dispensing device (e.g., a reagent tube, a waste tube, etc.) to a receiving device (e.g., a synthesis column, a waste valve, etc.). Alignment detectors may also detect the tilt angle of an object (e.g., the angle of a plane of an object with respect to a reference plane). For example, the tilt angle of a plate mounted on a shaft may be detected to ensure a proper perpendicular relationship between the plate and the shaft. Alignment detectors include, but are not limited to, motion sensors, infra-red or LED-based detectors, and the like.

As used herein, the term "motor connector" refers to any type of connection between a motor and another object. For example a motor designed to rotate another object may be connected to the object through a metal shaft, such that the rotation of the shaft, rotates the object. The metal shaft would be considered a motor connector.

As used herein, the term "packing material" refers to material placed in a passageway (e.g., a synthesis column) in a manner such that it provides resistance against a pressure differential between the two ends of the passageway (i.e. hinders the discharge of the pressure differential). Packing material may comprise a single material or multiple materials. For example, in some embodiments of the present invention, packing material comprising a nucleic acid synthesis matrix (e.g., a solid support for nucleic acid synthesis such as controlled pore glass, polystyrene, etc.) and/or one or more frits are used in synthesis columns to maintain a pressure differential between the two ends of the synthesis column.

As used herein, the term "idle," in reference to a synthesis column, refers to columns that do not take part in a particular synthesis reaction step of a nucleic acid synthesizer. Idle synthesis columns include, but are not limited to, columns in which no synthesis occurs at all, as well as columns in which synthesis has been completed (e.g., for short oligonucleotide) while other columns are actively undergoing additional synthesis steps (e.g., for longer oligonucleotides).

As used herein, the term "active," in reference to a synthesis column, refers to columns that take part (or are taking part) in a particular synthesis reaction step of a nucleic acid synthesizer. Active synthesis columns include, but are not limited to, columns in which liquid reagents are being dispensed into, or columns that contain liquid reagents (e.g. waiting to be purged), or columns that are in the process of being purged.

As used herein, the term "alignment markers" refers to reference points on an object that allow the object to be aligned to one or more other objects. Alignment markers include pictorial markings (e.g., arrows, dots, etc.) and reflective markings, as well as pins, raised surfaces, holes, magnets, and the like.

DETAILED DESCRIPTION OF THE INVENTION

While the present invention will be described with reference to several specific embodiments, the description is illustrative of the present invention and is not to be construed as limiting the invention. Various modifications to the present invention can be made without departing from the scope and spirit of the present invention. For example, much of the following description is provided in the context of an open system synthesizer (see, e.g., WO99/65602). However, the invention is not limited to open system synthesizers.

Figure 1:
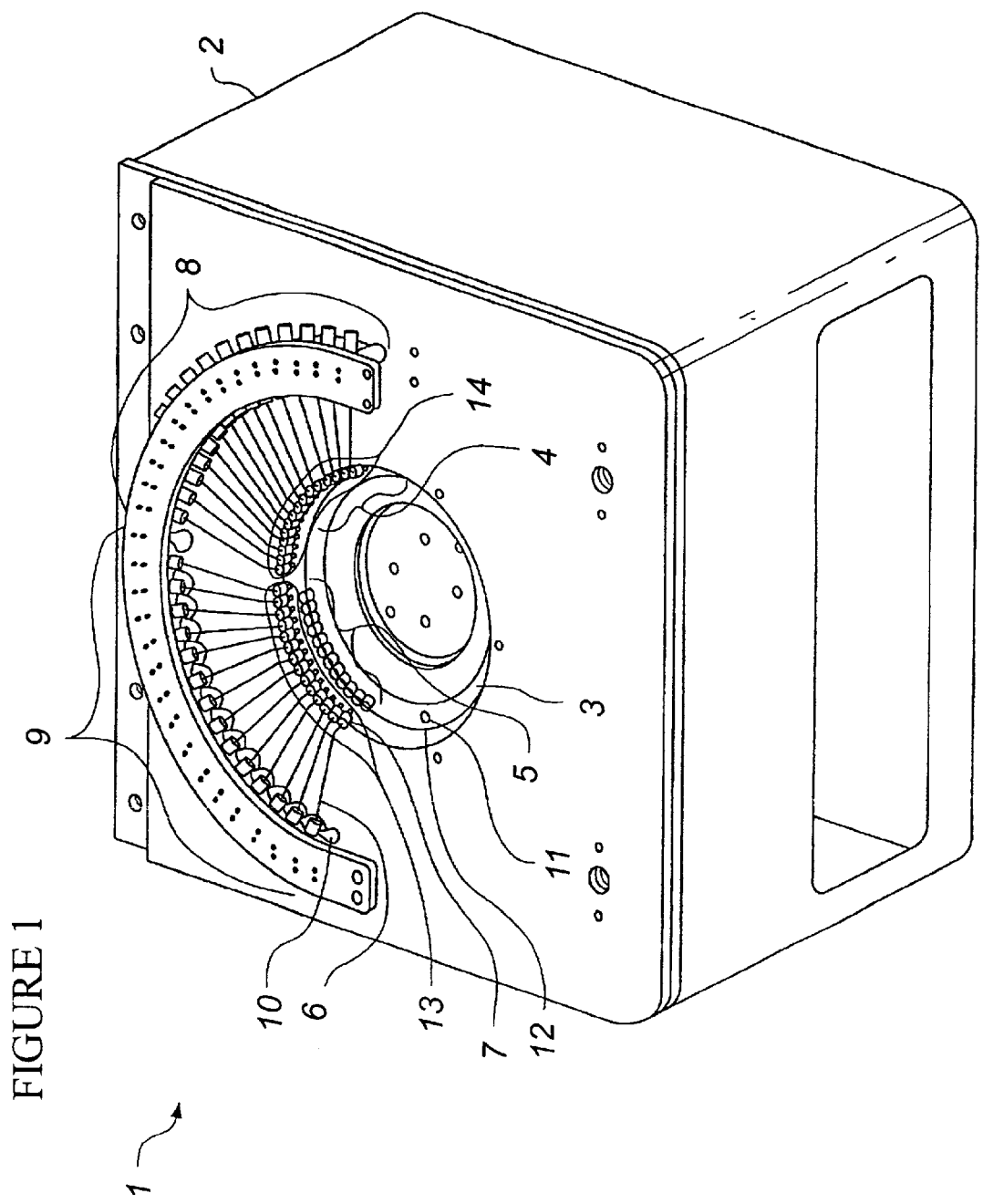
FIG. 1 is a perspective view of a rotary synthesizer.

FIG. 1 illustrates a synthesizer 1. The synthesizer 1 is designed for building a polymer chain by sequentially adding polymer units to a solid support in a liquid reagent. The liquid reagents used for synthesizing oligonucleotides may vary, as the successful operation of the present invention is not limited to any particular coupling chemistry. Examples of suitable liquid reagents include, but are not limited to: Acetonitrile (wash); 2.5% dichloroacetic acid in methylene chloride (deblock); 3% tetrazole in acetonitrile (activator); 2.5% cyanoethyl phosphoramidite in acetonitrile (A, C, G, T); 2.5% iodine in 9% water, 0.5% pyridine, 90.5% THF (oxidizer); 10% acetic anhydride in tetrahydrofuran (CAP A); and 10% 1-methylimidazole, 10% pyridine, 80% THF. Various useful reagents and coupling chemistries are described in U.S. Pat. No. 5,472,672 to Bennan, and U.S. Pat. No. 5,368,823 to McGraw et al. (both of which are herein incorporated by reference in their entireties).

The solid support generally resides within a synthesis column and various liquid reagents are sequentially added to the synthesis column. Before an additional liquid reagent is added to a synthesis column, the previous liquid reagent is preferably purged from the synthesis column. Although the synthesizer 1 is particularly suited for building nucleic acid sequences, the synthesizer 1 is also configured to build any other desired polymer chain or organic compound (e.g. peptide sequences).

The synthesizer 1 preferably comprises at least one bank of valves and at least one bank of synthesis columns. Within each bank of synthesis columns, there is at least one synthesis column for holding the solid support and for containing a liquid reagent such that a polymer chain can be synthesized. Within the bank of valves, there are preferably a plurality of valves configured for selectively dispensing a liquid reagent into one of the synthesis columns. The synthesizer 1 is preferably configured to allow each bank of synthesis columns to be selectively purged of the presently held liquid reagent. In particularly preferred embodiments, the synthesizer of the present invention is configured to allow synthesis columns within a bank to be purged even when not all of the synthesis columns contain liquid reagents (e.g. only a portion of the synthesis columns in a bank received a liquid reagent (i.e. "active"), while the remaining synthesis columns are no longer receiving liquid reagent (i.e. "idle"). For example, in some preferred embodiments of the present invention, the design of the material in the synthesis columns allows idle columns to resist the downward pressure of gas, thus making this pressure available to purge the synthesis columns that contain liquid reagent. Additional banks of valves provide the synthesizer 1 with greater flexibility. For example, each bank of valves can be configured to distribute liquid reagents to a particular bank of synthesis columns in a parallel fashion to minimize the processing time.

Multiple banks of valves can also be configured to distribute liquid reagents to a particular bank of synthesis columns in series. This allows the synthesizer 1 to hold a larger number of different reagents, thus being able to create varied nucleic acid sequences (e.g. 48 oligonucleotides, each with a unique sequence).

FIG. 1 illustrates a top view of a rotary synthesizer 1. As illustrated in FIG. 1, the synthesizer 1 includes a base 2, a cartridge 3, a first bank of synthesis columns 4, a second bank of synthesis columns 5, a plurality of dispense lines 6, a plurality of fittings 7 (a first bank of fittings 13, and a second bank of fittings 14), a first bank of valves 8 and a second bank of valves 9. Within each of the banks of valves 8 and 9, there is preferably at least one valve. Within each of the banks of synthesis columns 4 and 5, there is preferably at least one synthesis column. Each of the valves is capable of selectively dispensing a liquid reagent into one of the synthesis columns. Each of the synthesis columns is preferably configured for retaining a solid support such as polystyrene or CPG and holding a liquid reagent. Further, as each liquid reagent is sequentially deposited within the synthesis column and sequentially purged therefrom, a polymer chain is generated (e.g. nucleic acid sequence).

Preferably, there is a plurality of reservoirs, each containing a specific liquid reagent to be dispensed to one of the plurality of valves 8 or 9. Each of the valves within the first bank and second bank of valves 8 and 9, is coupled to a corresponding reservoir. Each of the plurality of reservoirs is pressurized (e.g. by argon gas). As a result, as each valve is opened, a particular liquid reagent from the corresponding reservoir is dispensed to a corresponding synthesis column. Each of the plurality of dispense lines 6 is coupled to a corresponding one of the valves within the first and second banks of valves 8 and 9. Each of the plurality of dispense lines 6 provides a conduit for transferring a liquid reagent from the valve to a corresponding synthesis column. Each one of the plurality of dispense lines 6 is preferably configured to be flexible and semi-resilient in nature. In preferred embodiments, the dispense lines of the present invention have a large bore size to prevent clogging. In preferred embodiments, the internal diameter of the dispense tube is at least 0.25 mm. In other embodiments, the internal diameter of the tube is at least 0.50 mm or at least 0.75 mm. In some embodiments, the internal diameter of the tube is greater than or equal to 1.0 mm (e.g. 1.0 mm, or 1.2 mm, or 1.4 mm). Preferably, the plurality of dispense lines 6 are each made of a material such as PEEK, glass, or coated with TEFLON or Parlene, or coated/uncoated stainless steel or other metallic material. Of course other materials may also be used. For example, useful characteristics of the material used for the dispense lines would be resistance to degradation by the liquid reagents, minimal "wetting" by the liquid reagents, ease of fabrication, relative rigidity, and ability to be produced with a smooth surface finish. Metallic tubing (e.g. stainless steel), benefit from electropolishing to improve the surface finish (e.g. in coated or uncoated application). Another important characteristic of useful dispense lines in the ability to provide a seal between the plurality of valves 10 and the plurality of fittings 7.

Each of the plurality of fittings 7 is preferably coupled to one of the plurality of dispense lines 6. The plurality of fittings 7 are preferably configured to prevent the reagent from splashing outside the synthesis column as the reagent is dispensed from the fitting to a particular synthesis column positioned below the fitting. In preferred embodiments, the fitting includes a nozzle that prevents reagents from drying at the point fluid exits the nozzle (e.g. prevents dried reagents from causing the reagents stream to dispense at angles away from the intended synthesis column). Construction techniques to achieve consistent flow at the discharge point of the liquid reagents is achieved by the use of high quality parts and construction. For example, clean square cuts (without burrs or shavings), or the use of a "drawn tip" (i.e., a tip of reduced diameter at the discharge point). The use of a drawn tip, for example, reduces the wall thickness at the point of discharge, thus reducing the area of the tube wall cross section, providing a smooth transition from the larger portion of the tube (reducing flow resistance) and increases the likelihood of a clean separation of the discharged liquid reagent from the tip of the tube. This clean "snap" of the liquid reagent minimizes the retention of the discharged fluid at the tip, and thus minimizes subsequent build up of any solids (e.g. dried reagent). Additionally, if a sharp cut off of the fluid flow is obtained, the fluid front will actually reside within the confines of the tube after discharge of the desired volume. This minimizes surface evaporation and helps to maintain a clean orifice (e.g. prevent reagent from drying at the tip). Another example of a useful technique to prevent liquid reagent from drying at the discharge point is providing a sleeve or sheath over the dispense line to a point near the tip (dispense point). This sleeve or sheath is particularly useful when employed in conjunction with a relatively flexible dispense line.

As shown in FIG. 1, the first and second banks of valves 8 and 9 each have thirteen valves. In FIG. 1, the number of valves in each bank is merely for exemplary purposes (e.g. other numbers of valves may be employed, like 14, 15, 16, 17, etc).

Each of the synthesis columns within the first bank of synthesis columns 4 and the second bank of synthesis columns 5 is presently shown resting in one of a plurality of receiving holes 11 within the cartridge 3. Preferably, each of the synthesis columns within the corresponding plurality of receiving holes 11 is positioned in a substantially vertical orientation. Each of the synthesis columns is configured to retain a solid support such as polystyrene or CPG and hold liquid reagent(s). In preferred embodiments, polystyrene is employed as the solid support. Alternatively, any other appropriate solid support can be used to support the polymer chain being synthesized.

During synthesizer operation, each of the valves selectively dispenses a liquid reagent through one of the plurality of dispense lines 6 and fittings 7. The first and second banks of valves 8 and 9 are preferably coupled to the base 2 of the synthesizer 1. The cartridge 3 which contains the plurality of synthesis columns 12 rotates relative to the synthesizer 1 and relative to the first and second banks of valves 8 and 9. By rotating the cartridge 3, a particular synthesis column 12 is positioned under a specific valve such that the corresponding reagent from this specific valve is dispensed into this synthesis column. In preferred embodiments, the cartridge 3 has a home position that allows the synthesizer to be properly aligned before operation (such that the liquid reagent is properly dispensed into the synthesis columns). Further, the first and second banks of valves 8 and 9 are capable of simultaneously and independently dispensing liquid reagents into corresponding synthesis columns.

Figure 2:
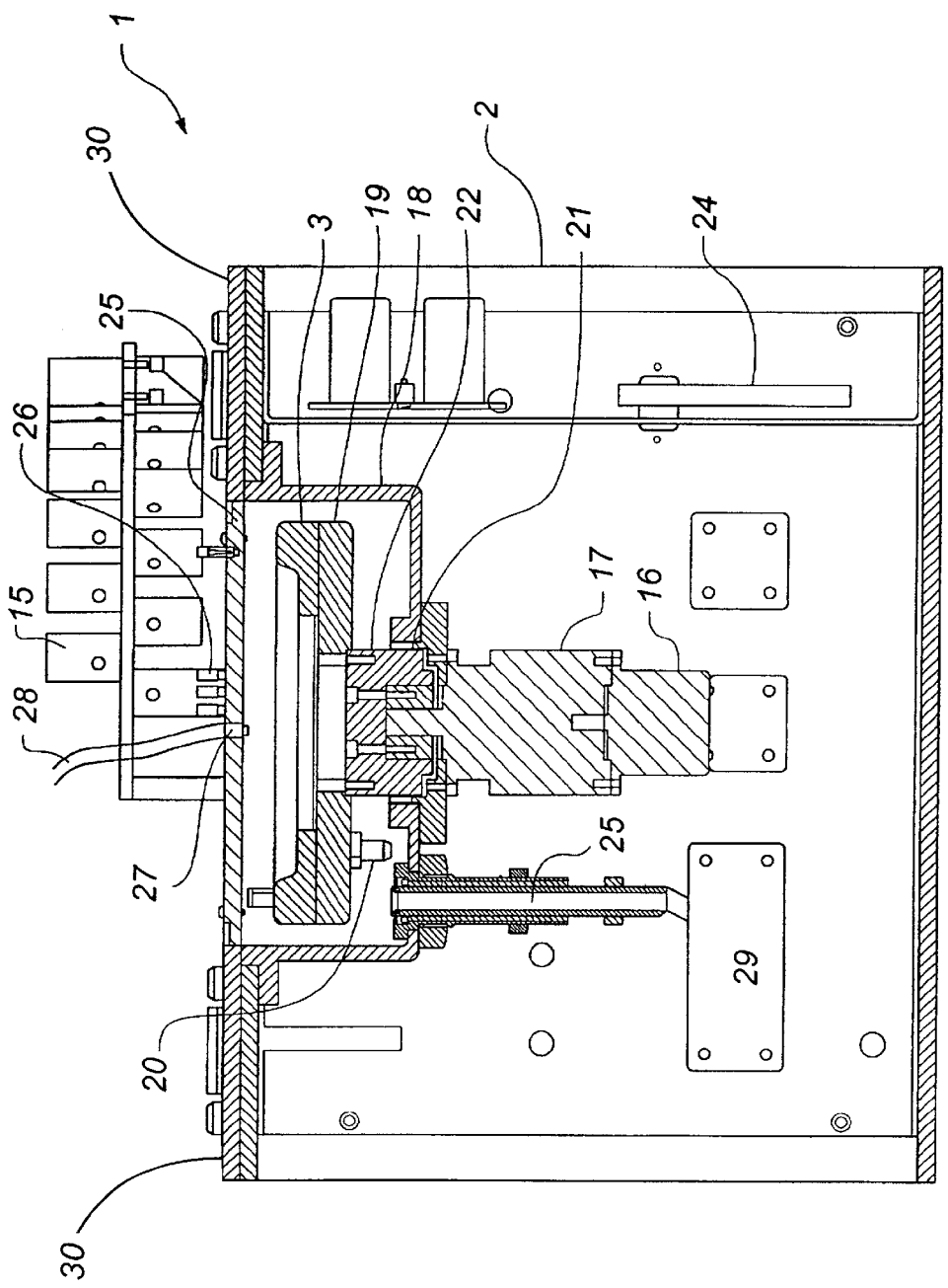
FIG. 2 is a cross-sectional view of a rotary synthesizer.

A cross sectional view of synthesizer 1 is depicted in FIG. 2. As depicted in FIG. 2, the synthesizer 1 includes the base 2, a set of valves 15, a motor 16, a gearbox 17, a chamber bowl 18, a drain plate 19, a drain 20, a cartridge 3, a bottom chamber seal 21, a motor connector 22, a waste tube system 23, a controller 24, and a clear window 25. The valves 15 are coupled to base 2 of the synthesizer 1 and are preferably positioned above the cartridge 3 around the outside edge of the base 2. This set of valves 15 preferably contains fifteen individual valves which each deliver a corresponding liquid reagent in a specified quantity to a synthesis column held in the cartridge 3 positioned below the valves. Each of the valves may dispense the same or different liquid reagents depending on the user-selected configuration. When more than one valve dispenses the same reagent, the set of valves 15 is capable of simultaneously dispensing a reagent to multiple synthesis columns within the cartridge 3. When the valves 15 each contain different reagents, each one of the valves 15 is capable of dispensing a corresponding liquid reagents to any one of the synthesis columns within the cartridge 3.

The synthesizer 1 may have multiple sets of valves. The plurality of valves within the multiple sets of valves may be configured in a variety of ways to dispense the liquid reagents to a select one or more of the synthesis columns. For example, in one configuration, where each set of valves is identically configured, the synthesizer 1 is capable of simultaneously dispensing the same reagent in parallel from multiple sets of valves to corresponding banks of synthesis columns. In this configuration, the multiple banks of synthesis columns may be processed in parallel. In the alternative, each individual valve within multiple sets of valves may contain entirely different liquid reagents such that there is no duplication of reagents among any individual valves in the multiple sets of valves. This configuration allows the synthesizer 1 to build polymer chains requiring a large variety of reagents without changing the reagents associated with each valve.

The motor 16 is preferably mounted to the base 2 through the gear box 17 and the motor connector 22. The chamber bowl 18 preferably surrounds the motor connector 22 and remains stationary relative to the base 2.

Figure 9:
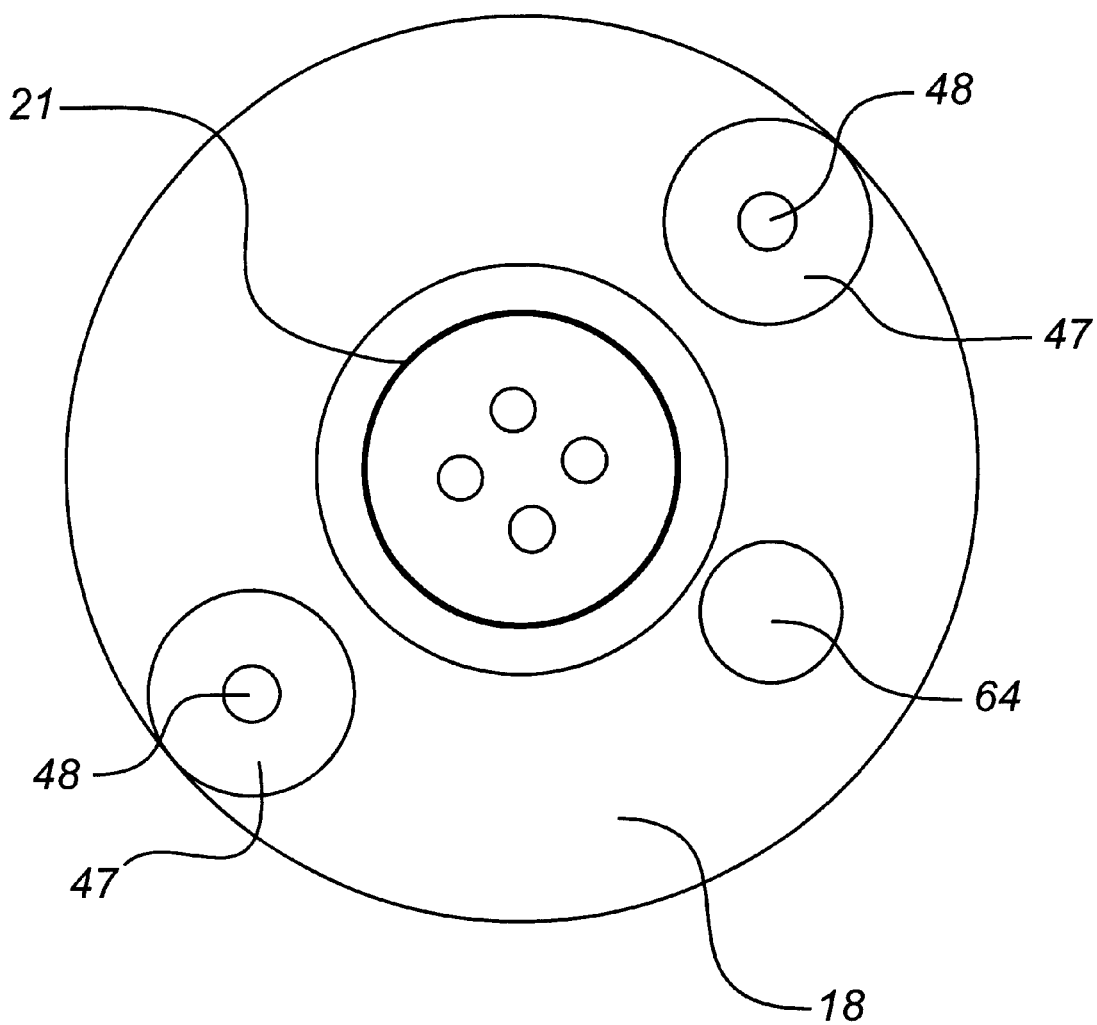
FIG. 9 is a top view of a chamber bowl and waste tube system.

The chamber bowl 18 is designed to hold any reagent spilled from the plurality of synthesis columns 12 during the purging process (or the dispensing process). Further, the chamber bowl 18 is configured with a tall shoulder to insure that spills are contained within the bowl 18. The bottom chamber seal 21 preferably provides a seal around the motor connector 22 in order to prevent the contents of the chamber bowl 18 from flowing into the gear box 17 (see FIG. 9). The bottom chamber seal 21 is preferably composed of a flexible and resilient material such as TEFLON (or elastomer which conforms to any irregularities of the motor connector 22). Alternatively, the bottom chamber seal can be composed of any other appropriate material. In particularly preferred embodiments, the bottom chamber seal is composed of material that resists constant contact with liquid reagents (e.g., TEFLON or Parlene). Additionally, the bottom chamber seal 21 may have frictionless properties that allow the motor connector 22 to rotate freely within the seal. For example, coating this flexible material with TEFLON helps to achieve a low coefficient of friction.

The clear window 25 is attached to (formed in) a top cover 30 of the synthesizer 1 and covers the area above the cartridge 3. The top cover 30 of synthesizer 1 seals the top part of the chamber (when in place), and opens up allowing an operator or maintenance person access to the interior of the synthesizer 1. The clear window 25 in top cover 30 allows the operator to observe the synthesizer 1 in operation while providing a pressure sealed environment within the interior of the synthesizer 1. As shown in FIG. 2, there are a plurality of through holes 26 in the clear window 25 to allow the plurality of dispense lines 6 to extend through the clear plate 25 to dispense material into the synthesis columns located in cartridge 3.

The clear window 25 also includes a gas fitting 27 attached therethrough. The gas fitting 27 is coupled to a gas line 28. The gas line 28 preferably continuously emits a stream of inert gas (e.g. Argon) which flows into the synthesizer 1 through the gas fitting 27 and flushes out traces of air and water from the plurality of synthesis columns 12 within the synthesizer 1. Providing the inert gas flow through the gas fitting 27 into the synthesizer 1 prevents the polymer chains being formed within the synthesis columns from being contaminated without requiring the plurality of synthesis columns 12 to be hermetically sealed and isolated from the outside environment.

Figure 3:
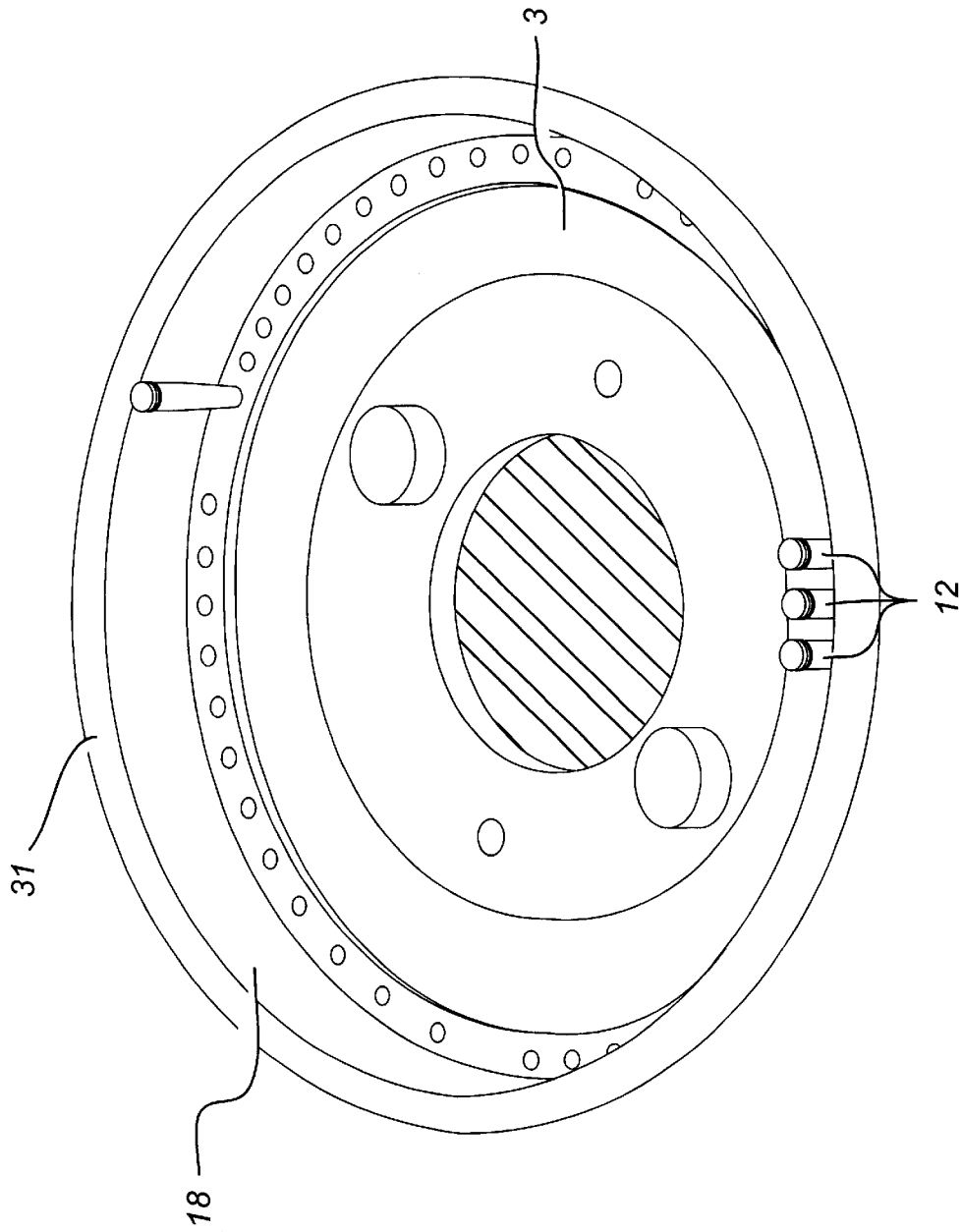
FIG. 3 is a view of a cartridge in a chamber bowl of a synthesizer.

FIG. 3 shows the cartridge 3 in chamber bowl 18, with the top plate 30 removed, thus revealing the top chamber seal 31. Top chamber seal 31 is designed to provide a tight seal between top plate 30 and chamber bowl 18, such that inert gas applied through clear window 25 does not leak. If the top chamber seal 31 does not function properly, the inert gas leaks out (lowering the pressure in the chamber), thus causing the purge operation (that relies on the pressure on the inert gas) to fail. When the purge operation fails, un-purged columns quickly fill up and overflow. In some embodiments, a V-seal type top chamber seal is employed to prevent leakage of gas. In some embodiments, the hinges and latches on top plate 30 (not shown) are precisely machined to provide balanced forces on the top plate 30, such that the top plate 30 fits tightly over the chamber bowl.

Figure 4:
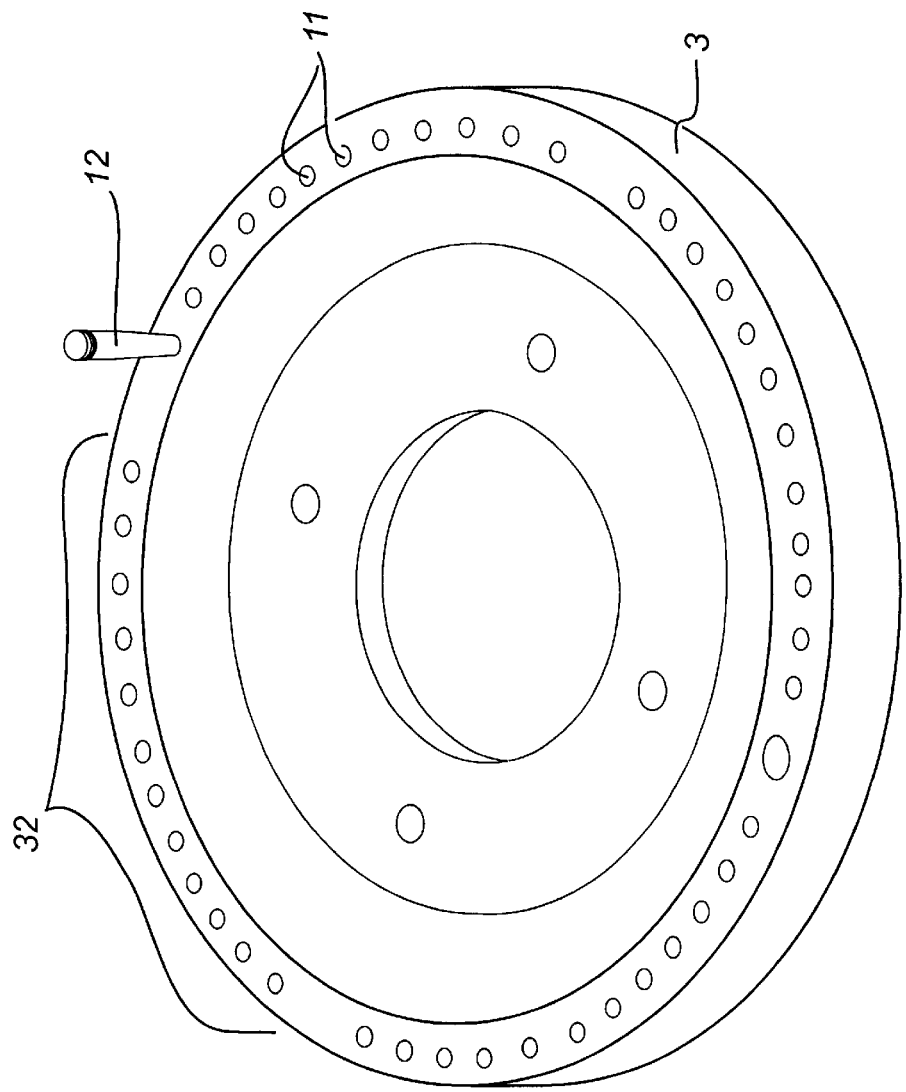
FIG. 4 is a view of a cartridge.

FIG. 4 illustrates a detailed view of a cartridge 3 for synthesizer 1. Preferably, the cartridge 3 is circular in shape such that it is capable of rotating in a circular path relative to the base 2 and the first and second banks of valves 8 and 9. The cartridge 3 has a plurality of receiving holes 11 on its upper surface around the peripheral edge of the cartridge 3. Each of the plurality of receiving holes 11 is configured to hold one of the synthesis columns 12. The plurality of receiving holes 11, as shown on the cartridge 3, is divided up among four banks. A bank 32 illustrates one of the four banks on the cartridge 3 and contains twelve receiving holes, wherein each receiving hole is configured to hold a synthesis column. An exemplary synthesis column 12 is shown being inserted into one of the plurality of receiving holes 11. The total number of receiving holes shown on the cartridge 3 includes forty-eight (48) receiving holes, divided into four banks of twelve receiving holes each. The number of receiving holes and the configuration of the banks of receiving holes is shown on the cartridge 3 for exemplary purposes only. Any appropriate number of receiving holes and banks of receiving holes can be included in the cartridge 3. Preferably, the receiving holes 11 within the cartridge each have a precise diameter for accepting the synthesis columns 12, which also each have a corresponding precise exterior surface 61 (see FIG. 10) to provide a pressure-tight seal when the synthesis columns 12 are inserted into the receiving holes 11. In preferred embodiments, the synthesis column includes a column seal 65 (see FIG. 10), such as a ring seal or a ball seal (e.g., a flexible TEFLON ring that flexes on engagement of the synthesis column in the receiving hole 11).

Figure 5:
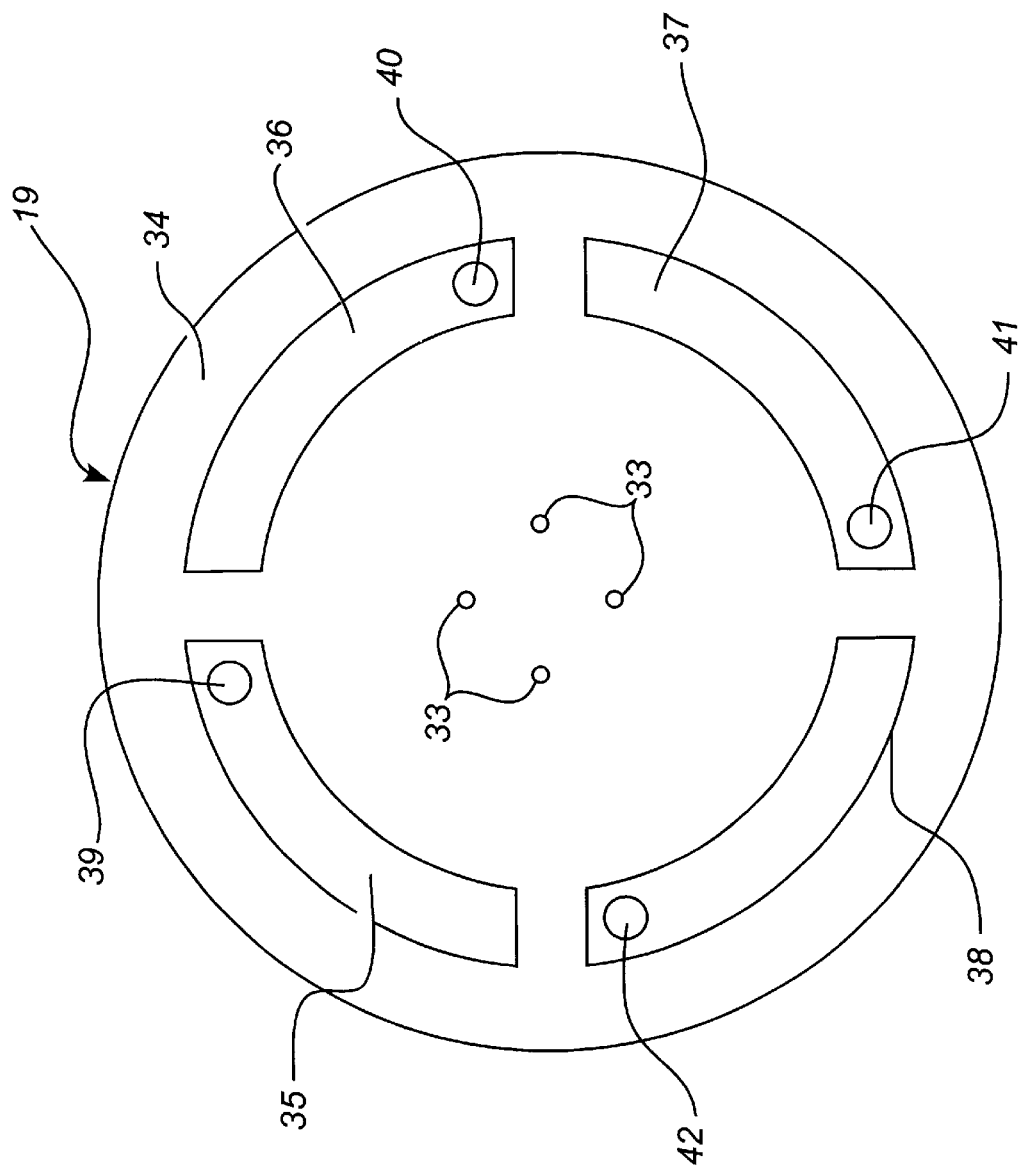
FIG. 5 is a view of a drain plate for a synthesizer.

FIG. 5 depicts an exemplary drain plate 19 of the synthesizer 1. The drain plate 19 is coupled to the motor connector 22 (not shown) through securing holes 33. More specifically, the drain plate 19 is attached to the motor connector 22, which rotates the drain plate 19 while the motor 16 is operating and the gear box 17 is turning. The cartridge 3 and the drain plate 19 are preferably configured to rotate as a single unit. The drain plate 19 is configured to catch and direct the liquid reagents as the liquid reagents are expelled from the plurality of synthesis columns (during the purging process). During operation, the motor 16 is configured to rotate both the cartridge 3 and the drain plate 19 through the gear box 17 and the motor connector 22. The bottom chamber seal 21 allows the motor connector 22 to rotate the cartridge 3 and the drain plate 19 through a portion of the chamber bowl 18 while still containing spilled reagents in the chamber bowl 18. The controller 24 is coupled to the motor 16 to activate and deactivate the motor 16 in order to rotate the cartridge 3 and the drain plate 19. The controller 24 (see FIGS. 2 and 11) provides embedded control to the synthesizer and controls not only the operation of the motor 16, but also the operation of the valves 15 and the waste tube system 23.

The drain plate 19 has a plurality of securing holes 33 for attaching to the motor connector 22. The drain plate 19 also has a top surface 34 which may, in some embodiments, attach to the underside of the cartridge 3. In other embodiments, a drain plate gasket is provided between the drain plate 19 and cartridge 3 (see below). As stated previously, the cartridge 3 holds the plurality of synthesis columns grouped into a plurality of banks. The drain plate preferably has a collection area corresponding to each of the banks of synthesis columns (e.g. four in FIG. 5 to correspond to the four banks of synthesis columns in cartridge 3). Each of these four collection areas 35, 36, 37 and 38 in FIG. 5, forms a recessed area below the top surface 34 and is designed to contain and direct material flushed from the synthesis columns within the bank above the collection area.

Each of the four collection areas 35, 36, 37 and 38 is positioned below a corresponding one of the banks of synthesis columns on the cartridge 3. The drain plate 19 is rotated with the cartridge 3 to keep the corresponding collection area below the corresponding bank.

In FIG. 5, there are four drains 39, 40, 41, and 42 each of which is located within one of the four collection areas 35, 36, 37 and 38 respectively. In use, the collection areas are configured to contain material flushed from corresponding synthesis columns and pass that material through the drains. Preferably, there is a collection area and a drain corresponding to each bank of synthesis columns within the cartridge 3. Alternatively, any appropriate number of collection areas and drains can be included within a drain plate. FIG. 6A shows a top view of drain plate gaskets 43. The drain plate gasket is configured to be situated between drain plate 19 and cartridge 3. Drain plate gasket 43 is shown in FIG. 6A with guide holes 44 and drain cut-outs 57, 58, 59, and 60. Guide holes 44 allow the drain plate gasket to fit over the motor connector 22. Drain cut-outs 57–60 allow the bottom column opening of synthesis columns 12 to discharge material into collection areas 35–38 in drain plate 19. In other embodiments, the drain cut outs mirror the receiving holes in the cartridge (see cut-outs 60 in FIG. 6B), such that each column is able to discharge material into collection areas 35–38, while having a seal around each synthesis column. In some embodiments, all of the cut-outs are for the synthesis columns, like the cuts 60 depicted in FIG. 6B.

The drain plate gaskets of the present invention may be made of any suitable material (e.g. that will provide a tight seal above drain plate 19, such that gas and liquid do not escape). In some embodiments, the drain plate gasket is composed of rubber. Providing a tight seal between cartridge 3 and drain plate 19 with a drain plate gasket helps maintain the proper pressure of inert gas during purging procedures, such that synthesis columns with liquid reagent properly drain (preventing overflow during the next cycle). The seal between cartridge 3 and drain plate 19 may also be improved by the addition of grease between the components, or very finely machining the contact points between the two components. In other embodiments, the seal between the cartridge and drain plate is improved by physically bonding the plates together, or machining either the cartridge or drain plate such that concentric ring seals may inserted into the machined component. In still other embodiments, the two components are manufactured as a single component (e.g. a single components with all the features of both the cartridge and drain plate formed therein). In preferred embodiments, one component is provided with plurality of concentric circular rings that contact the flat surface of the other component and act as seals.

Figure 7:
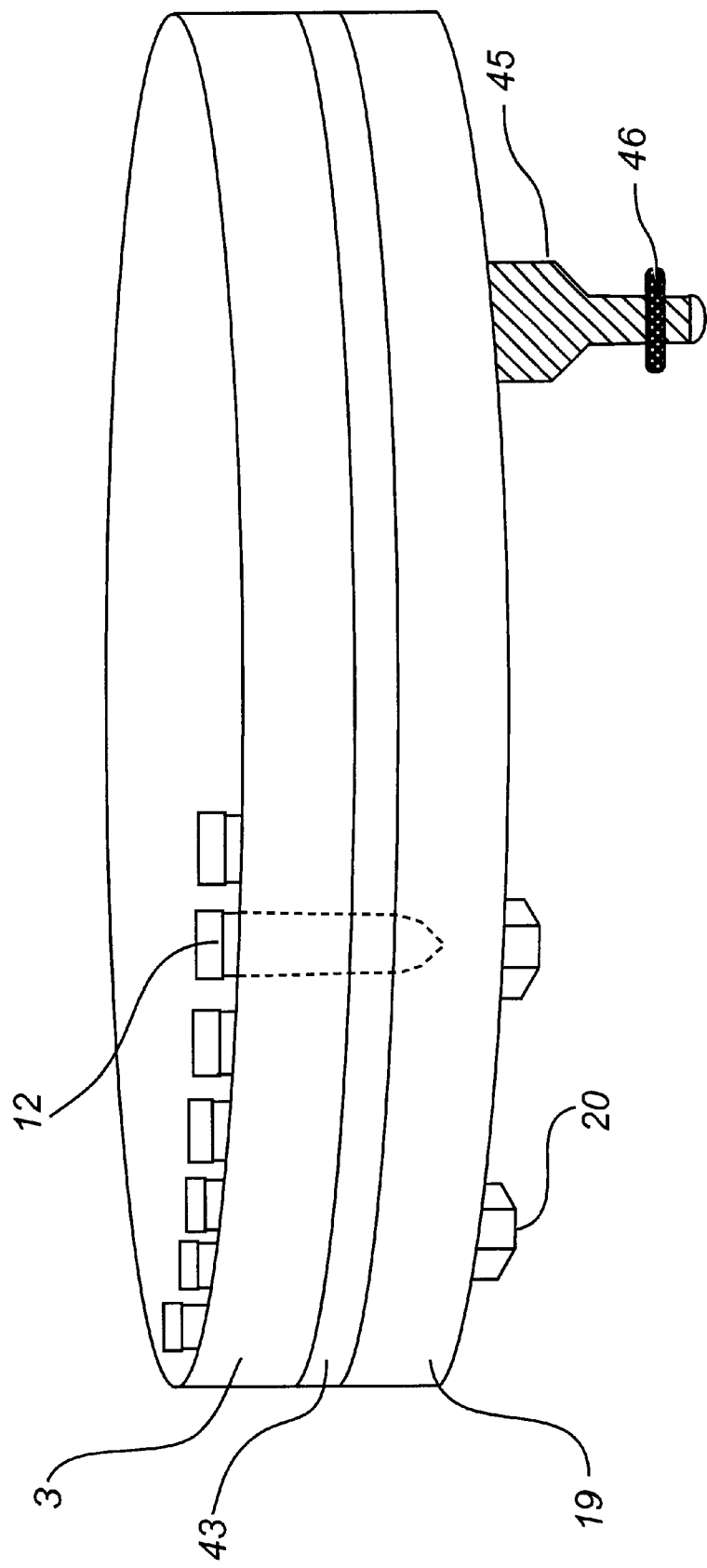
FIG. 7 is a side view of a drain plate gasket situated between a cartridge and a drain plate.

FIG. 7 shows a side view of a drain plate gasket 43 situated between cartridge 3 and drain plate 19. FIG. 7 also shows a drain 20 extending from drain plate 19. FIG. 7 also shows a drain with sealing ring 45 (sealing ring is labeled 46). The sealing ring 46 tightly seals the connection between the drain 45 and the waste tube system 23 (see FIG. 8). Also shown in FIG. 7 is a synthesis column 12 inserted in cartridge 3, passing through drain plate gasket 43, and ending in drain plate 19.

The waste tube system 23 is preferably utilized to provide a pressurized environment for flushing material including reagents from the plurality of synthesis columns located within a corresponding bank of synthesis columns and expelling this material from the synthesizer 1. Alternatively, the waste tube system 23 can be used to provide a vacuum for drawing material from the plurality of synthesis columns located within a corresponding bank of synthesis columns.

Figure 8:
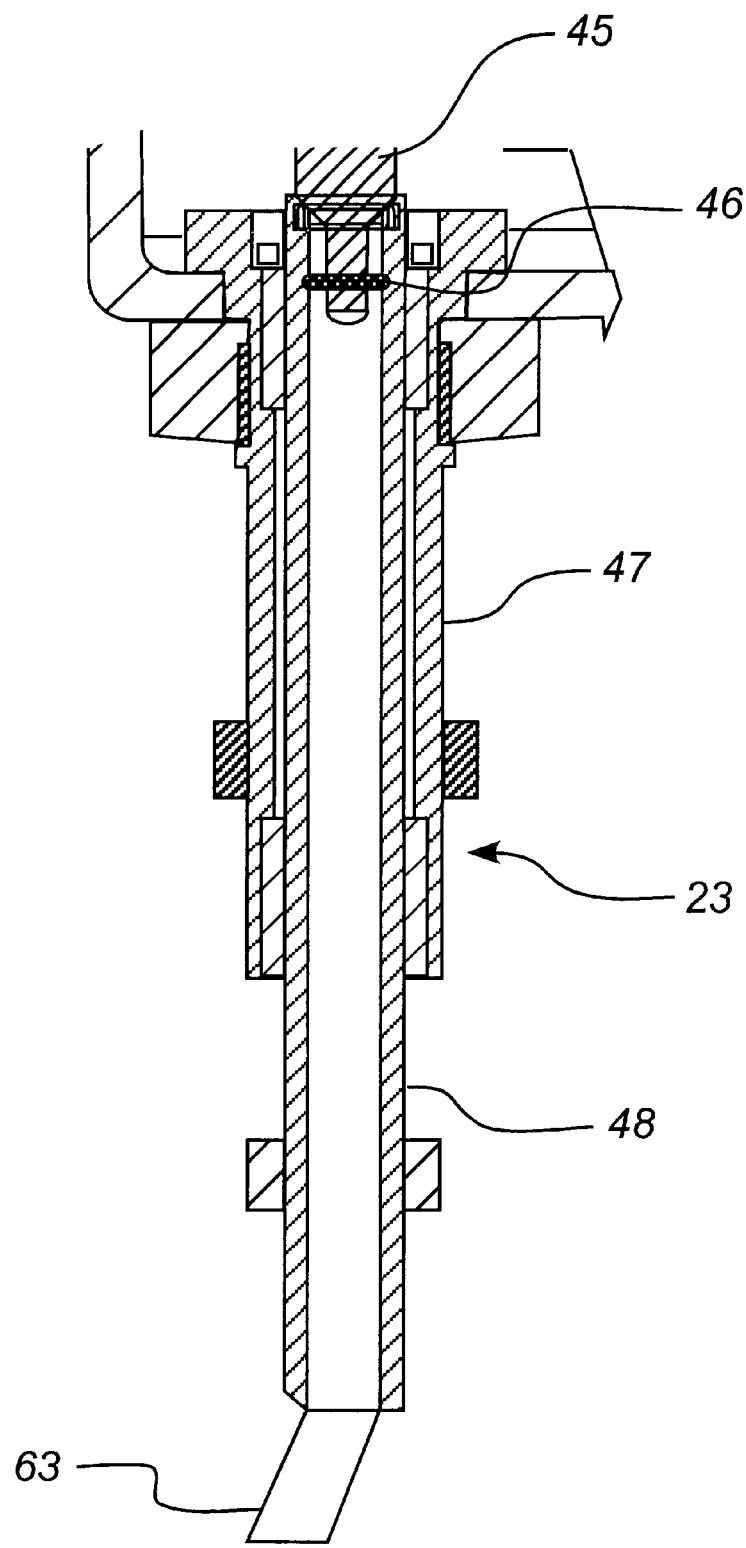
FIG. 8 is a cross-sectional view of a waste tube system.

A cross-sectional view of the waste tube system 23 is illustrated in FIG. 8. The waste tube system 23 comprises a stationary tube 47 and a mobile waste tube 48. The stationary tube 47 and the mobile waste tube 48 are slidably coupled together. The stationary tube 47 is attached to the chamber bowl 18 and does not move relative to the chamber bowl (see FIG. 9). In contrast, the mobile tube 48 is capable of sliding relative to the stationary tube 47 and the chamber bowl 18. When in an inactive state, the waste tube system 47 does not expel any reagents. During the inactive state, both the stationary tube 47 and the mobile tube 48 are preferably mounted flush with the bottom portion of the chamber bowl 18 (see FIG. 9). When in an active state, the waste tube system 23 purges the material from the corresponding bank of synthesis columns. During the active state, the mobile tube 48 rises above the bottom portion of the chamber bowl 18 towards the drain plate 19. The drain plate 19 is rotated over to position a drain corresponding to the bank to be flushed, above the waste tube system 23. The mobile tube 48 then couples to the drain (e.g., 20 or 45) and the material is flushed out of the corresponding bank of synthesis columns and into the drain plate 19. The liquid reagent is purged from the corresponding bank of synthesis columns due to a sufficient pressure differential between a top opening 49 (FIG. 10) and a bottom opening 50 (FIG. 10) of each synthesis column. This sufficient pressure differential is preferably created by coupling the mobile waste tube 48 to the corresponding drain. Alternatively, the waste tube system 23 may also include a vacuum device 29 (see, FIG. 2) coupled to the stationary tube 47 wherein the vacuum device 29 is configured to provide this sufficient pressure differential to expel material from the corresponding bank of synthesis columns. When this sufficient pressure differential is generated, the excess material within the synthesis columns being flushed, then flows through the corresponding drain and is carried away via the waste tube system 23.

When engaging the corresponding drain to flush a bank of synthesis columns, preferably the mobile tube 48 slides over the corresponding drain such that the mobile tube 48 and the drain act as a single unit. Alternatively, the waste tube system 23 includes a mobile tube 48 which engages the corresponding drain by positioning itself directly below the drain and then sealing against the drain without sliding over the drain. The mobile tube 48 may include a drain seal positioned on top of the mobile tube. In this embodiment, during a flushing operation, the mobile tube 48 is not locked to the corresponding drain. In the event that this drain is accidentally rotated while the mobile waste tube 48 is engaged with the drain, the drain and mobile tube 48 of the synthesizer 1 will simply disengage and will not be damaged. If this occurs while material is being flushed from a bank of synthesis columns, any spillage from the drain is contained within the chamber bowl 18. In preferred embodiments, the bottom of the chamber bowl 18 has a chamber drain 64 (see FIG. 9) to collect and remove any spilled material in the chamber bowl. In this regard, material may be removed before it builds up and leaks into other parts of the synthesizer (e.g. motor 16 or gear box 17). In some embodiments of the present invention, the chamber drain is in a closed position during synthesis and purging. When the top cover of the synthesizer is opened, the chamber drain can be opened, drawing out unwanted gaseous or liquid emissions (e.g., using a vacuum source). Coordination of the chamber drain opening to the top cover opening may be accomplished by mechanical or electric means.

Configuring the waste tube system 23 to expel the reagent while the mobile waste tube 48 is coupled to the drain allows the present invention to selectively purge individual banks of synthesis columns. Instead of simultaneously purging all the synthesis columns within the synthesizer 1, the present invention selectively purges individual banks of synthesis columns such that only the synthesis columns within a selected bank or banks are purged.

Preferably, the synthesizer 1 includes two waste tube systems 23 for flushing two banks of synthesis columns simultaneously. Alternatively, any appropriate number of waste tube systems can be included within the synthesizer 1 for selectively flushing banks of synthesis columns. In preferred embodiments, the waste tube systems 23 are spaced on opposite sides of the chamber bowl 18 (i.e. they are directly across from each other, see FIG. 9). In this regard, the force on the drain plate 19 is equalized during flushing procedures (e.g. the drain plate is less likely to tip one way or the other from force being applied to just one side of the plate). Alternatively, a single waste tube system 23 may be provided for flushing the plurality of banks of synthesis columns. When a single waste tube system is used, it is preferred that a balancing force be provided on the opposite side of the drain plate 19, e.g., such as would be provided by the presence of a second waste tube system 23. In one embodiment, a balancing force is provided by a dummy waste tube system (not shown), that may be actuated in the same fashion as the waste tube system 23, but which does not serve to drain the bank of synthesis columns to which it is deployed.

In use, the controller 24, which is coupled to the motor 16, the valves 15, and the waste tube system 23, coordinates the operation of the synthesizer 1. The controller 24 controls the motor 16 such that the cartridge is rotated to align the correct synthesis columns with the dispense lines 6 corresponding to the appropriate valves 15 during dispensing operations and that the correct one of the drains 39, 40, 41, and 42 are aligned with an appropriate waste tube system 23 during a flushing operation.

Figure 10:
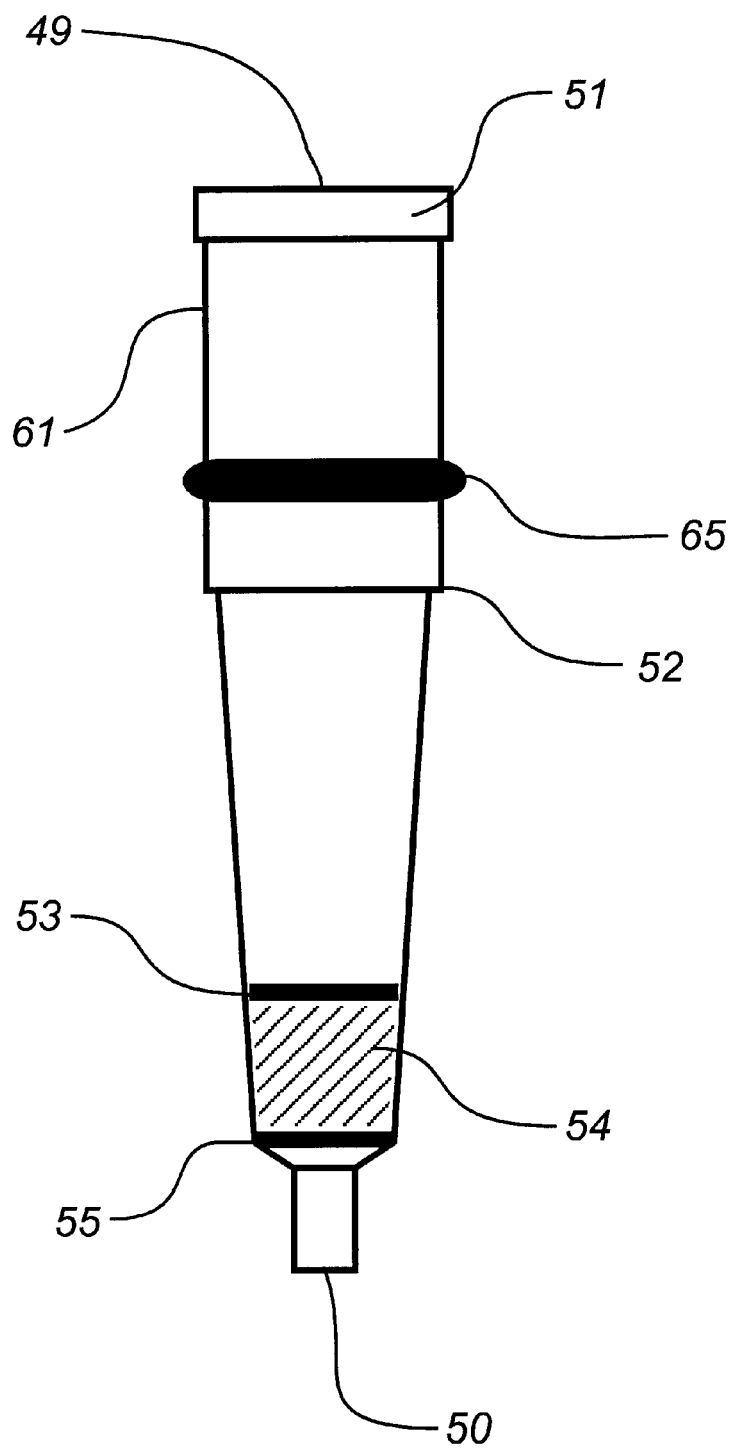
FIG. 10 is a cross-sectional view of a synthesis column.

FIG. 10 illustrates a cross sectional view of a synthesis column 12. The synthesis column is an integral portion of the synthesizer 1. Generally, the polymer chain is formed within the synthesis column 12. More specifically, the synthesis column 12 holds a solid support 54 on which the polymer chain is grown. Examples of suitable solid supports include, but are not limited to, polystyrene, controlled pore glass, and silica glass. As stated previously, to create the polymer chain, the solid support 54 is sequentially submerged in various reagents for a predetermined amount of time. With each deposit of a reagent, an additional unit is added, or the solid support is washed, or failure sequences are capped, etc. Preferably, the solid support 54 is held within the synthesis column 12 by a bottom frit 55. In particularly preferred embodiments, a top frit 53 is included above the solid support (e.g. to help resist downward gas pressure when the particular synthesis column does not have liquid reagents, but other synthesis columns within the bank are being purged of their liquid contents). The synthesis column 12 includes a top opening 49 and a bottom opening 50. During the dispensing process, the synthesis column 12 is filled with a reagent through the top opening 49. During the purging process, the synthesis column 12 is drained of the reagent through the bottom opening 50. The bottom frit 55 prevents the solid support from being flushed away during the purging process.

The exterior surface 61 of each synthesis column 12 fits within the receiving hole 11 within the cartridge 3 and provides a pressure tight seal around each synthesis column within the cartridge 3. Preferably, each synthesis column is formed of polyethylene or other suitable material.

In preferred embodiments, the material inside the synthesis column (e.g. in FIG. 10, this includes top frit 53, solid support 54, and bottom frit 55) is configured to resist the downward pressure of gas (e.g., to provide back pressure) applied during the purging process when the particular synthesis column does not have liquid reagent. In this regard, other synthesis columns that do contain liquid reagents may be successfully purged with the application of gas pressure during the purging process (i.e. the synthesis columns without liquid reagent do not allow a substantial portion the gas pressure applied during the purging process to escape through their bottom openings). Other packing materials may also be added to the synthesis columns to help maintain the pressure differential across the column when it is idle.

One method for constructing a synthesis column that successfully resists the downward pressure of gas (when no liquid reagent has been added to this column) is to include a top frit in addition to a bottom frit. Determining what type of top frit is suitable for any given synthesis column and type of solid support may be determined by test runs in the synthesizer. For example, the columns may be loaded into the synthesizer with the candidate top frit (and solid support and bottom frit), and instructions for synthesizing different length oligonucleotides inputted (i.e., this will allow certain columns to sit idle while other columns are still having liquid dispensed into them and purged out). Observation through the glass panel, examining the amount of leakage from overflowing columns, and testing the quality of the resulting oligonucleotides, are all methods to determine if the top frit is suitable (e.g., a thicker or smaller pore top frit may be employed if problems associated with insufficient back pressure are seen). By combining the appropriate packing material in columns with the appropriate delivered pressure to the chamber, purging can be efficiently carried out, avoiding spill-over that can result in synthesis or instrument failure.

Another method for constructing a synthesis column that successfully resists the downward pressure of gas (when no liquid reagent has been added to this column) is to provide a solid support that resists this downward force even when no liquid reagent is in the columns. One suitable solid support material is polystyrene (e.g. U.S. Pat. No. 5,935,527 to Andrus et al., hereby incorporated by reference). In some embodiments, the styrene (of the polystyrene) is cross-linked with a cross-linking material (e.g. divinylbenzene). In some embodiments, the cross-linking ratio is 10–60 percent. In preferred embodiments, the cross-linking ration is 20–50 percent. In particularly preferred embodiments, the cross-linking ratio is about 30–50 percent. In some embodiments, the polystyrene solid support is used in conjunction with a top frit in order to successfully resist the downward pressure of gas during the purging process. In some embodiments, the polystyrene is used as the solid support for synthesis. In other embodiments, a different support, such as controlled pore glass, is used as the support for the synthesis reaction, and the polystyrene is provided only to increase the back pressure from a column comprising a CPG or other synthesis support.

There are many advantages of configuring synthesis columns to successfully resist downward gas pressure during the purging process. One advantage is the fact that not all the synthesis columns need to contain liquid reagent during the purging process in order for the purge to be successful. Instead, one or more of the synthesis columns may remain idle during a particular cycle, while the other synthesis columns continue to receive liquid reagents. In this regard, oligonucleotides of different lengths may be constructed (e.g., a 20-mer constructed in one synthesis column may be completed and sit idle, while a 32-mer is constructed in a second synthesis column). Achieving successful purges after each liquid addition prevents liquid leakage (e.g. additional liquid reagent applied to a synthesis column that was not successfully purged will cause the column to overflow).

Figure 11:
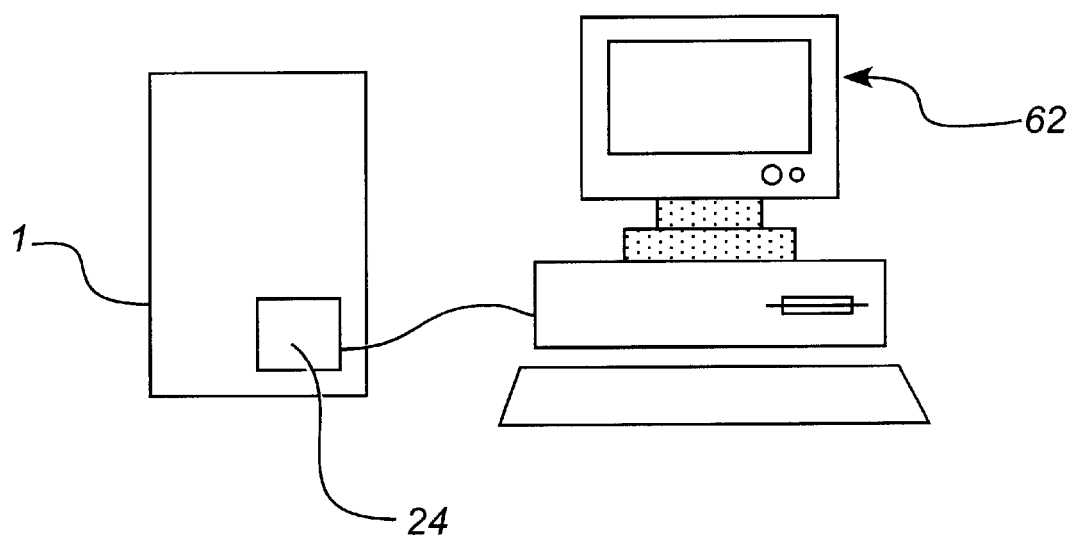
FIG. 11 is a view of a computer system coupled to a synthesizer.

FIG. 11 illustrates a computer system 62 coupled to the synthesizer 11. The computer system 62 preferably provides the synthesizer 1, and specifically the controller 24, with operating instructions. These operating instructions may include, for example, rotating the cartridge 3 to a predetermined position, dispensing one of a plurality of reagents into selected synthesis columns through the valves 15 and dispense lines 6, flushing the first bank of synthesis columns 4 and/or the second bank of synthesis columns 5, and coordinating a timing sequence of these synthesizer functions. U.S. Pat. 5,865,224 to Ally et al. (herein incorporated by reference in its entirety), further demonstrates computer control of synthesis machines. Preferably, the computer system 62 allows a user to input data representing oligonucleotide sequences to form a polymer chain via a graphical user interface.

After a user inputs this data, the computer system 62 instructs the synthesizer 1 to perform appropriate functions without any further input from the user. The computer system 62 preferably includes a processor, an input device and a display. The computer 62 can be configured as a laptop or a desktop, and may be operably connected to a network (e.g. LAN, internet, etc.).

In some embodiments, the present invention provides alignment detectors for detecting the alignment of any of the components of the present invention, as desired. In some embodiments, when a misalignment is detected, an alarm or other signal is provided so that a user can assure proper alignment prior to further operation. In other embodiments, when a misalignment is detected, a processor operates a motor to adjust that alignment. Alignment detectors find particular use in the present invention for assuring the alignment of any components that are involved in an exchange of liquid materials. For example, alignment of dispense lines and synthesis columns and alignment of drains and waste tubes should be monitored. Likewise, the tilt angle of the cartridge or any other component that should be parallel to the work surface can be monitored with alignment detectors.

The present invention also provides synthesizer arrays (e.g., groups of synthesizers). In some embodiments, the synthesizers are arranged in banks. For example, a given bank of synthesizers may be used to produce one set of oligonucleotides. The present invention is not limited to any one synthesizer. Indeed, a variety of synthesizers are contemplated, including, but not limited to, the synthesizers described above, MOSS EXPEDITE 16-channel DNA synthesizers (PE Biosystems, Foster City, Calif.), OligoPilot (Amersham Pharmacia,), and 3948 48-Channel DNA synthesizers (PE Biosystems, Foster City, Calif.). In some embodiments, two or more different DNA synthesizers are combined in one bank in order to optimize the quantities of different oligonucleotides needed. This allows for the rapid synthesis (e.g., in less than 4 hours) of an entire set of oligonucleotides.

In some embodiments the DNA synthesizer array includes at least 100 synthesizers. In other embodiments, the DNA synthesizer component includes at least 200 synthesizers. In still other embodiments, the DNA synthesizer component includes at least 250 synthesizers. In some embodiments, the DNA synthesizers are run 24 hours a day.

In some embodiments, the DNA synthesizers in the oligonucleotide synthesis array further comprise an automated reagent supply system (e.g., instead of, or in addition to, the reagent reservoirs discussed above). The automated reagent supply system delivers reagents necessary for synthesis to the synthesizers from a central supply area. For example, in some embodiments, acetonitrile is supplied via stainless steel tubing through the automated supply system. De-blocking solution may also be supplied directly to DNA synthesizers through tubing. In some preferred embodiments, the reagent supply system tubing is designed to connect directly to the synthesizers without modifying the synthesizers. Additionally, in some embodiments, the central reagent supply is designed to deliver reagents at a constant and controlled pressure. The amount of reagent circulating in the central supply loop is maintained at 8 to 12 times the level needed for synthesis in order to allow standardized pressure at each instrument. The excess reagent also allows new reagent to be added to the system without shutting down. In addition, the excess of reagent allows different types of pressurized reagent containers to be attached to one system. The excess of reagents in one centralized system further allows for one central system for chemical spills and fire suppression.

In some embodiments, the DNA synthesis component includes a centralized argon delivery system. The system includes high-pressure argon tanks adjacent to each bank of synthesizers. These tanks are connected to large, main argon tanks for backup. In some embodiments, the main tanks are run in series. In other embodiments, the main tanks are set up in banks. In some embodiments, the system further includes an automated tank switching system. In some preferred embodiments, the argon delivery system further comprises a tertiary backup system to provide argon in the case of failure of the primary and backup systems.

In some embodiments, the DNA synthesis array further comprises a centralized waste collection system. The centralized waste collection system comprises cache pots for central waste collection. In some embodiments, the cache pots include level detectors such that when waste level reaches a preset value, a pump is activated to drain the cache into a central collection reservoir. In preferred embodiments, ductwork is provided to gather fumes from cache pots. The fumes are then vented safely through the roof, avoiding exposure of personnel to harmful fumes. In preferred embodiments, the air handling system provides an adequate amount of air exchange per person to ensure that personnel are not exposed to harmful fumes. The coordinated reagent delivery and waste removal systems increase the safety and health of workers, as well as improving cost savings.

In some embodiments, all of the DNA synthesizers in the synthesizer array are attached to a centralized control system (e.g., a computer attached to each synthesizer is operably connected to a centralized control system). The centralized control system controls all areas of operation, including, but not limited to, power, pressure, reagent delivery, waste, and synthesis. In some preferred embodiments, the centralized control system includes a clean electrical grid with uninterrupted power supply. Such a system minimizes power level fluctuations. In additional preferred embodiments, the centralized control system includes alarms for air flow, status of reagents, and status of waste containers. The alarm system can be monitored from the central control panel. The centralized control system allows additions, deletions, or shutdowns of one synthesizer or one block of synthesizers without disrupting operations of other instruments. The centralized power control allows user to turn instruments off instrument by instrument, bank by bank, or the entire module.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Improvement of a DNA Synthesizer

The present invention provides means of modifying existing oligonucleotide synthesis instruments to improve efficiency, reliability, and safety. In this Example, a commercially available instrument is modified to provide an improved synthesizer of the present invention.

The Northwest Engineering 48-Column Oligonucleotide Synthesizer (NEI-48, Northwest Engineering, Inc., Alameda, Calif.) is an "open system" synthesizer in that the dispensing tubes for the delivery of reagents are not affixed to each synthesis vial or column for the entire term of the synthesis process. Instead, movement of a round cartridge containing the columns allows each dispensing tube to serve multiple columns. In addition, when a synthesis column is positioned to receive reagent, the dispenser is not even temporarily affixed to the vial with a sealed coupling. The reagent dispensed to the vial has open contact with the surrounding environment of the chamber. The chamber containing the synthesis vials is isolated from the ambient environment by a top plate. The general design and operation of the NEI instrument is described in WO 99/656602.

The NEI-48 synthesizer includes external mounting points for various reagent bottles, such as the phosphoramidite monomers used to form the polymer chain, and the oxidizers, capping reagents and deblocking reagents used in the reaction steps. TEFLON tubing feeds liquid from each reagent bottle to its assigned valve on the top of the machine. The feeding is done under pressure from an argon gas source.

The operations of the machine are controlled using a computer. The computer is fitted with a motion control card connected via cabling to a motor controller in the synthesizer; in addition, the computer is connected to the synthesizer via an RS-232C cable. The provided software allows the user to monitor and control the machine's synthesis operations.

The machine also requires connection to a source of argon gas, to be delivered at a pressure between 15 and 60 psi, inclusive, and a source of compressed air or nitrogen, to be delivered at a pressure between 60 and 120 psi, inclusive.

Synthesis in the NEI-48 occurs within synthesizer columns that are arranged in the cartridge.

Operations of the NEI-48 in accordance with the manufacturer's instructions produced undesirable emissions and leakage resulting in potential synthesis and instrument failure. The following section details two of the sources of these emissions, and details one or more aspects of the present invention applied to solve each problem, to thereby improve the performance of this machine.

A. Column Overflow Due to Inadequate Argon Pressure

Undesirable emissions and exposure are increased when columns overflow, causing the hazardous reagents used during synthesis to collect in the chamber bowl. A number of types of malfunction in the machine can leads to incomplete drainage or purge of the columns, and each will eventually lead to column overflow as the instrument proceeds through its subsequent dispensing steps.

The flow of reagent and waste from the synthesis columns is controlled by a differential in the pressure of argon between the top and bottom openings of the column. When the pressure of argon on the top opening is not sufficiently high, the column will not drain or be purged completely, i.e., fluid that should be drained will remain in the column. This improper purging not only reduces the efficiency of the synthesis chemistry, it also leads to column overflow. Therefore, failure of either initial pressurization of the chamber, or leakage of argon from any coupling (in an amount great enough to reduce either the overall pressure of the system or the pressure differential across the synthesis column) may lead to undesirable emissions and exposure. One aspect of the present invention is to prevent column overflow by reducing leakage of argon at a variety of points in the system.

Figure 6:
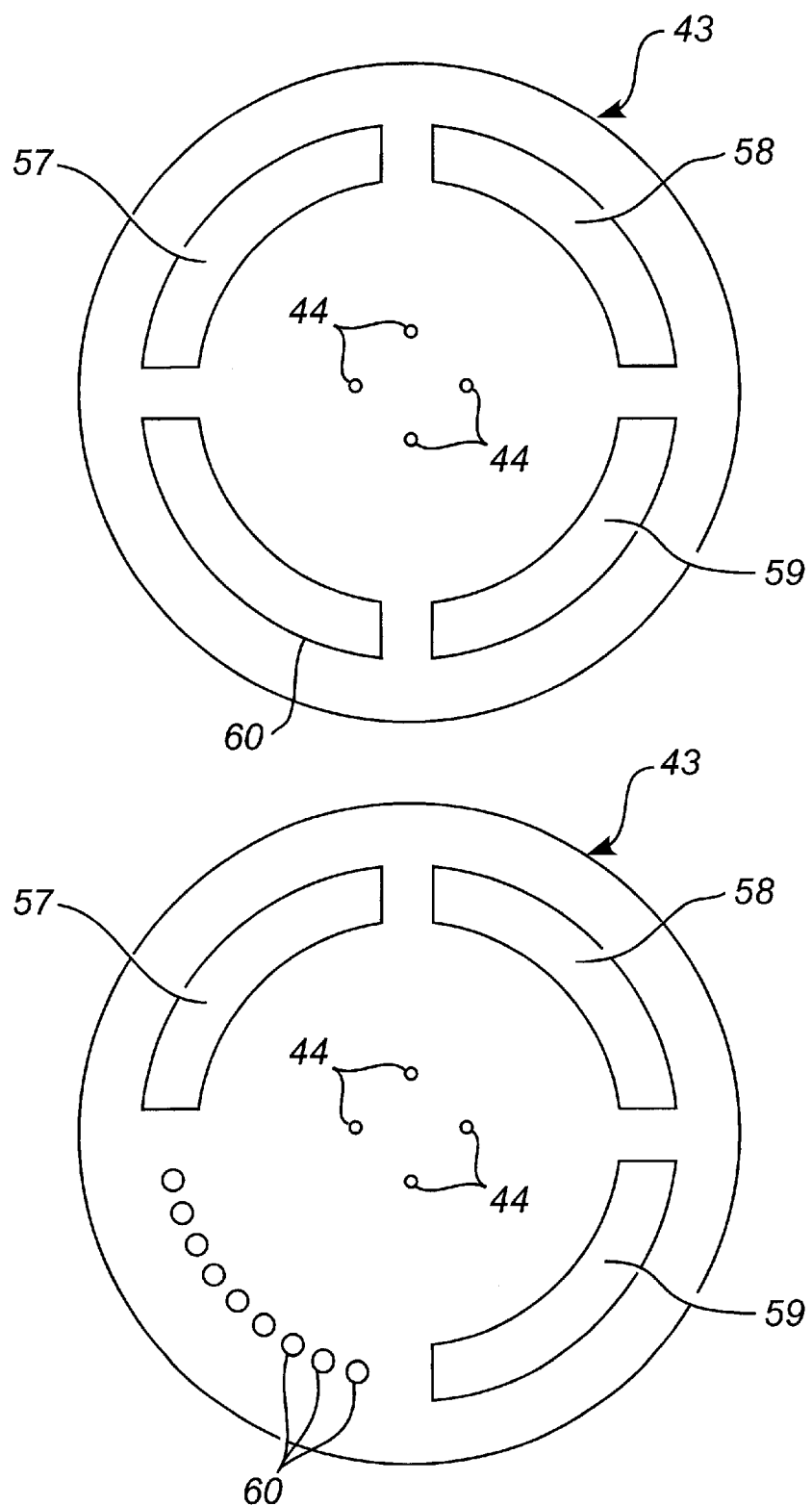
FIGS. 6A–6B show top views of drain plate gaskets.

The NEI-48 demonstrated a variety of failures as a result of argon leakage from or within the instrument. To address this problem, the drain plate gasket 43 of the present invention was created and was fitted between the cartridge and drain plate. Addition of the gasket to this assembly, as diagramed in FIG. 6, provided a pressure-tight seal, thereby containing the argon and allowing proper drainage of the columns at the purging step. The gasket of the present invention applied in this way improved the safety of the machine, and improved the efficiency of the synthesis reaction.

In another embodiment, a modified drain plate gasket was provided. The drain plate has securing holes 33, for attachment of the motor connector 22. The first gasket was of a design that avoided the areas of the motor connector 22 and the securing holes 33. A modified drain plate gasket was designed with guide holes 44 to fit closely around each securing hole 33, such that the holes served to place the gasket in a specific position between the cartridge and the drain plate (FIG. 6). In an alternative embodiment, the drain plate 19 and the cartridge 3 may be provided with other alignment features, such as pin fittings and corresponding pin receiving holes (not shown) to facilitate alignment of these parts during assembly (e.g., after cleaning). A modified drain plate gasket for use with these parts may be provided with pin guide holes (not shown). Use of either the securing holes 33, or pins fittings to align the gasket makes the gasket easier to position during assembly, ensuring proper operation of the gasket and improving ease of any maintenance that requires disassembly of these parts.

B. Emissions from Reagent Bottles

During normal operations and without any malfunction, fumes can nonetheless be emitted by the reagent bottles attached to the machine. These emissions can be increased by poor fit or incorrect seals around bottle caps. For example, the reagent bottles for the NEI-48 are affixed to the machine by clamps that apply pressure to the outside of the bottle caps. The clamps can distort the caps, increasing leakage and gaseous emissions.

One aspect of the present invention is to provide a means of collecting emissions from reagent bottles. For improving the NEI-48, a reagent stand comprising a ventilation tube was constructed. The stand holds the reagent bottles, thereby eliminating the need for the cap-distorting clamps, and consequently reducing emissions from the bottles; the ventilation tube removes any remaining emitted gases. This reagent dispensing station improves the safety of the machine in normal operation. The reagent dispensing station of the present invention is not limited to a configuration comprising a stand. It is envisioned that a station comprising a ventilation system may also be used with one or more bottles held in clamps. In preferred embodiments, at least one aspect of the reagent container system, e.g., the clamp, the cap, or the bottle, is modified such that clamping the reagent bottle does not compromise the containment function of the cap, or of any other aspect of the reagent container system. In one embodiment, the reagent dispensing station is an integral part of the base 2 of the synthesizer.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. A system comprising a synthesis and purge component contained in a chamber configured to maintain a gas pressure, said synthesis and purge component comprising a cartridge and a drain plate, wherein said cartridge is configured to hold one or more nucleic acid synthesis columns and wherein said cartridge is separated from said drain plate by a drain plate gasket, said system further comprising an alignment detector.

2. The system of claim 1, wherein said alignment detector is configured to detect the alignment of a waste tube and a drain.

3. The system of claim 1, wherein said alignment detector is configured to detect the alignment of a dispense line and a receiving hole of said cartridge.

4. The system of claim 1, wherein said alignment detector is configured to detect a tilt alignment of said synthesis and purge component.

5. A system comprising a synthesis and purge component contained in a chamber configured to maintain a gas pressure, said synthesis and purge component comprising a cartridge and a drain plate, wherein said cartridge is configured to hold one or more nucleic acid synthesis columns and wherein said cartridge is separated from said drain plate by a drain plate gasket, said system further comprising a motor attached to said synthesis and purge component and configured to rotate said synthesis and purge component.

6. The system of claim 5, wherein said motor is attached to said synthesis and purge component by a motor connector.

7. The system of claim 6, further comprising a bottom chamber seal positioned between said motor connector and said synthesis and purge component.

\* \* \* \* \*